United States Patent
Noguchi

(10) Patent No.: US 11,644,684 B2
(45) Date of Patent: May 9, 2023

(54) LENS APPARATUS AND IMAGE PICKUP APPARATUS

(71) Applicant: CANON KABUSHIKI KAISHA, Tokyo (JP)

(72) Inventor: Kazuhiro Noguchi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 158 days.

(21) Appl. No.: 17/172,370

(22) Filed: Feb. 10, 2021

(65) Prior Publication Data
US 2021/0271104 A1  Sep. 2, 2021

(30) Foreign Application Priority Data
Feb. 28, 2020 (JP) .............................. JP2020-032718

(51) Int. Cl.
*G02B 27/64* (2006.01)
*G02B 7/00* (2021.01)
*G02B 7/02* (2021.01)

(52) U.S. Cl.
CPC ........... *G02B 27/646* (2013.01); *G02B 7/005* (2013.01); *G02B 7/023* (2013.01); *G02B 27/642* (2013.01)

(58) Field of Classification Search
CPC ...... G02B 27/646; G02B 7/005; G02B 7/023; G02B 27/642; G02B 7/021; G02B 7/026; G02B 7/08; G03B 2205/0069; G03B 3/10
See application file for complete search history.

(56) References Cited

U.S. PATENT DOCUMENTS

| 5,515,210 | A | 5/1996 | Devenyi |
| 9,671,616 | B2 * | 6/2017 | Espersen .............. G02B 27/646 |
| 10,735,657 | B2 | 8/2020 | Kitayama et al. |

FOREIGN PATENT DOCUMENTS

| JP | H7-049443 A | 2/1995 |
| JP | 2011-164615 A | 8/2011 |
| JP | 2013-148752 A | 8/2013 |

* cited by examiner

*Primary Examiner* — Robert E. Tallman
(74) *Attorney, Agent, or Firm* — Carter, DeLuca & Farrell LLP

(57) ABSTRACT

A lens apparatus includes an optical element, a fixed member, a movable member configured to hold the optical element and movable in an optical axis direction relative to the fixed member, a guide member configured to guide a movement of the movable member in an optical axis direction, a first support member and a second support member spaced from each other in the optical axis direction, a pair of rotating elements held by the first support member and the second support member, respectively, and a biasing member configured to bias the pair of rotating elements and the guide member into contact with each other. The first support member and the second support member are fixed to one of the movable member and the fixed member. The guide member is fixed to the other of the movable member and the fixed member.

11 Claims, 21 Drawing Sheets

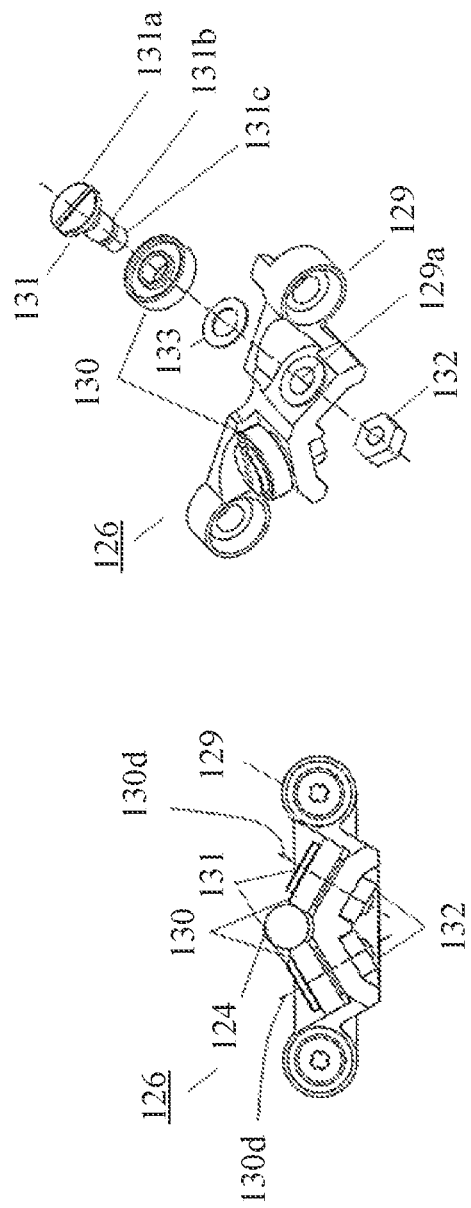
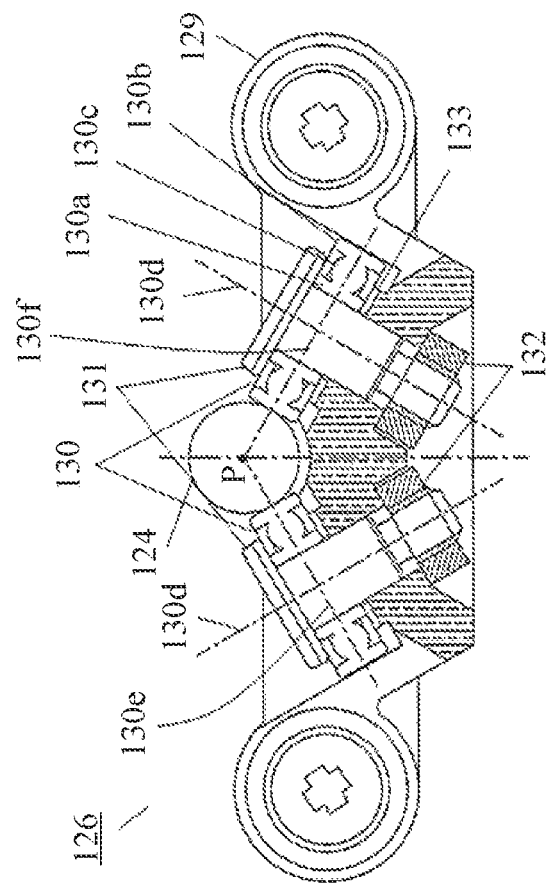
FIG. 4A
FIG. 4B
FIG. 4C

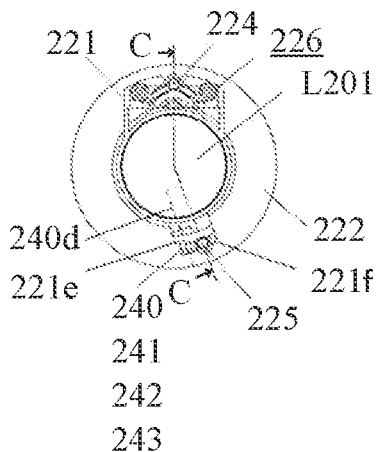
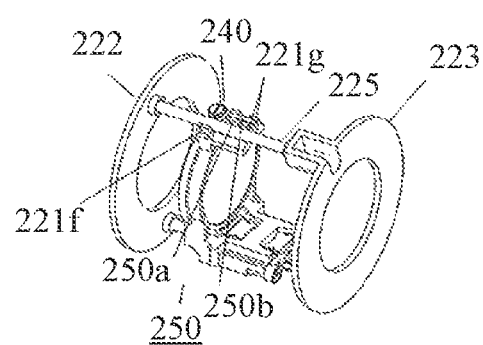
FIG. 10A  FIG. 10B
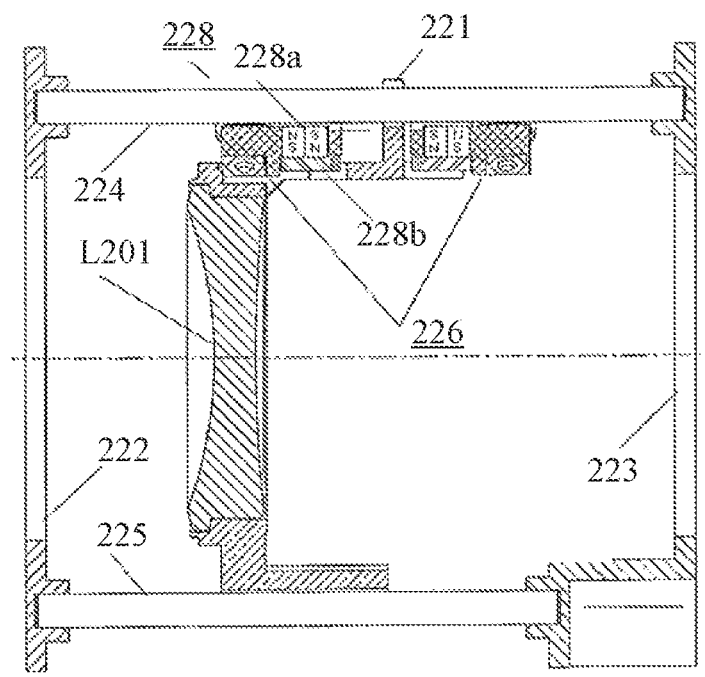
FIG. 10C

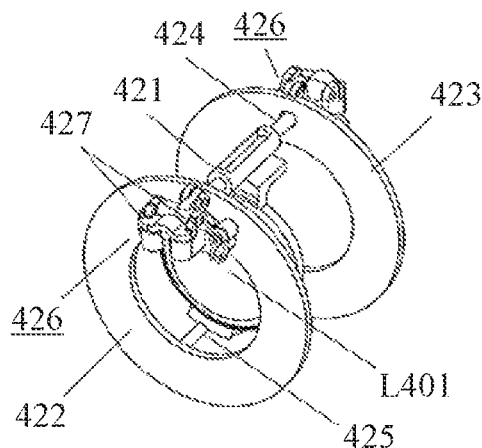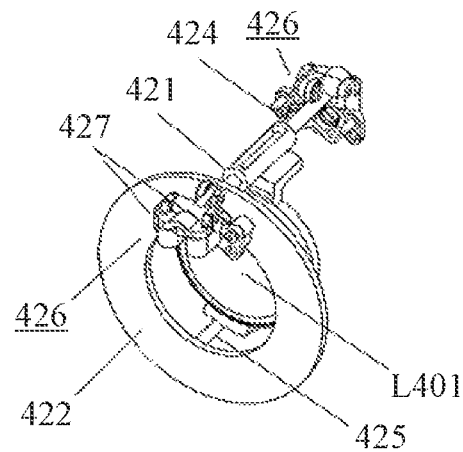
FIG. 15A   FIG. 15B
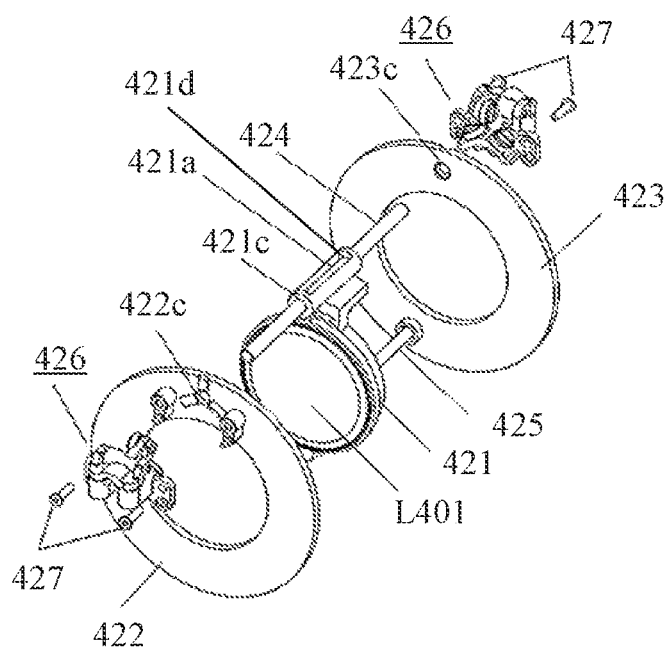
FIG. 15C

LENS APPARATUS AND IMAGE PICKUP APPARATUS

BACKGROUND OF THE INVENTION

Field of the Invention

The present invention relates to a lens apparatus and an image pickup apparatus.

Description of the Related Art

One known type of lens apparatus used for a video camera, a still camera, or the like guides a linear movement or a linear motion of a holding frame (moving frame or movable member) for holding a lens along two guide members extending in parallel and sandwiching an optical axis of an imaging optical system. In order to guide the linear motion of a heavy lens, this structure needs to maintain a stable state for changes of the gravity influence due to orientation changes of the lens apparatus. As a result, due to a large driving resistance necessary to move the lens, a large driving force is necessary and fine driving adjustments with high accuracy become difficult. Japanese Patent Laid-Open No. ("JP") 749443 discloses a lens apparatus having two guide rods and six ball bearings and configured to move a movable member with a small driving resistance.

In the structure of JP 7-49443, the position of the movable member shifts from the target position (designed position) due to errors in the finished size of the component, errors in the assembled position, assembly accuracy, etc., and the movable member may shift from the optical axis (reference optical axis), causing the tilt eccentricity (tilt), eccentricity (or decentering) including parallel eccentricity, etc.

SUMMARY OF THE INVENTION

The present invention provides, for example, a lens apparatus advantageous to a linear motion guidance of a movable member.

A lens apparatus according to one aspect of the present invention includes an optical element, a fixed member, a movable member configured to hold the optical element and movable in an optical axis direction relative to the fixed member, a guide member configured to guide a movement of the movable member in an optical axis direction, a first support member and a second support member spaced from each other in the optical axis direction, a pair of rotating elements held by the first support member and the second support member, respectively, and a biasing member configured to bias the pair of rotating elements and the guide member into contact with each other. The first support member and the second support member are fixed to one of the movable member and the fixed member. The guide member is fixed to the other of the movable member and the fixed member.

An image pickup apparatus including the above lens apparatus also constitutes another aspect of the present invention.

Further features of the present invention will become apparent from the following description of exemplary embodiments with reference to the attached drawings.

BRIEF DESCRIPTION OF THE DRAWINGS

FIGS. 4A to 4C are structural diagrams of a linear motion guiding unit according to the first embodiment.

FIGS. 10A to 10C are explanatory views around a main guide bar and a sub guide bar in the second embodiment.

FIGS. 15A to 15C are structural diagrams of a linear motion guiding mechanism according to a fourth embodiment.

DESCRIPTION OF THE EMBODIMENTS

Figure 1:
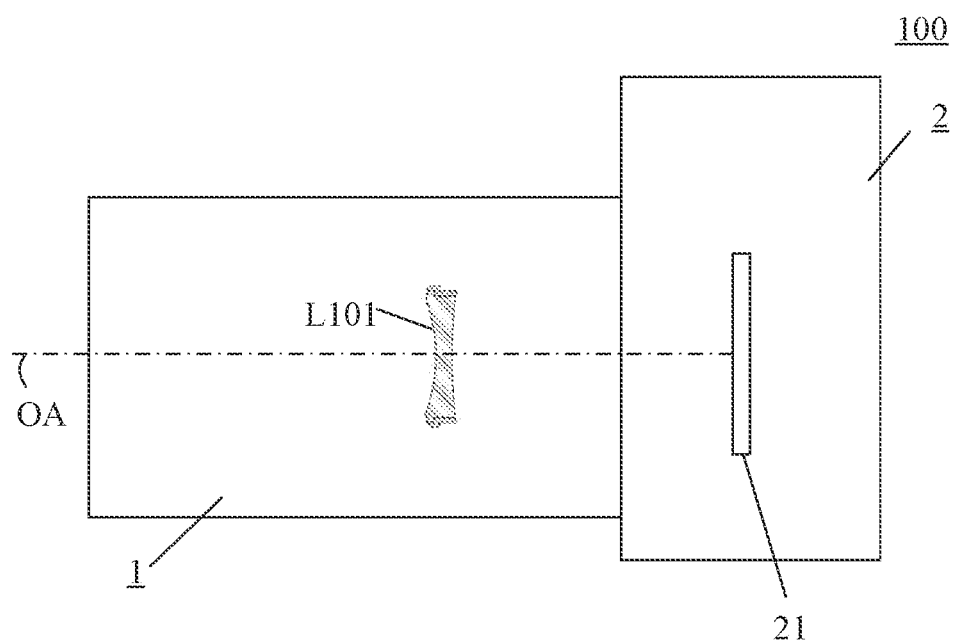
FIG. 1 is a schematic diagram of a camera system according to a first embodiment.

Referring now to the accompanying drawings, a detailed description will be given of embodiments according to the present invention. Corresponding elements in respective figures will be designated by the same reference numerals, and a duplicate description thereof will be omitted.

First Embodiment

Figure 2:
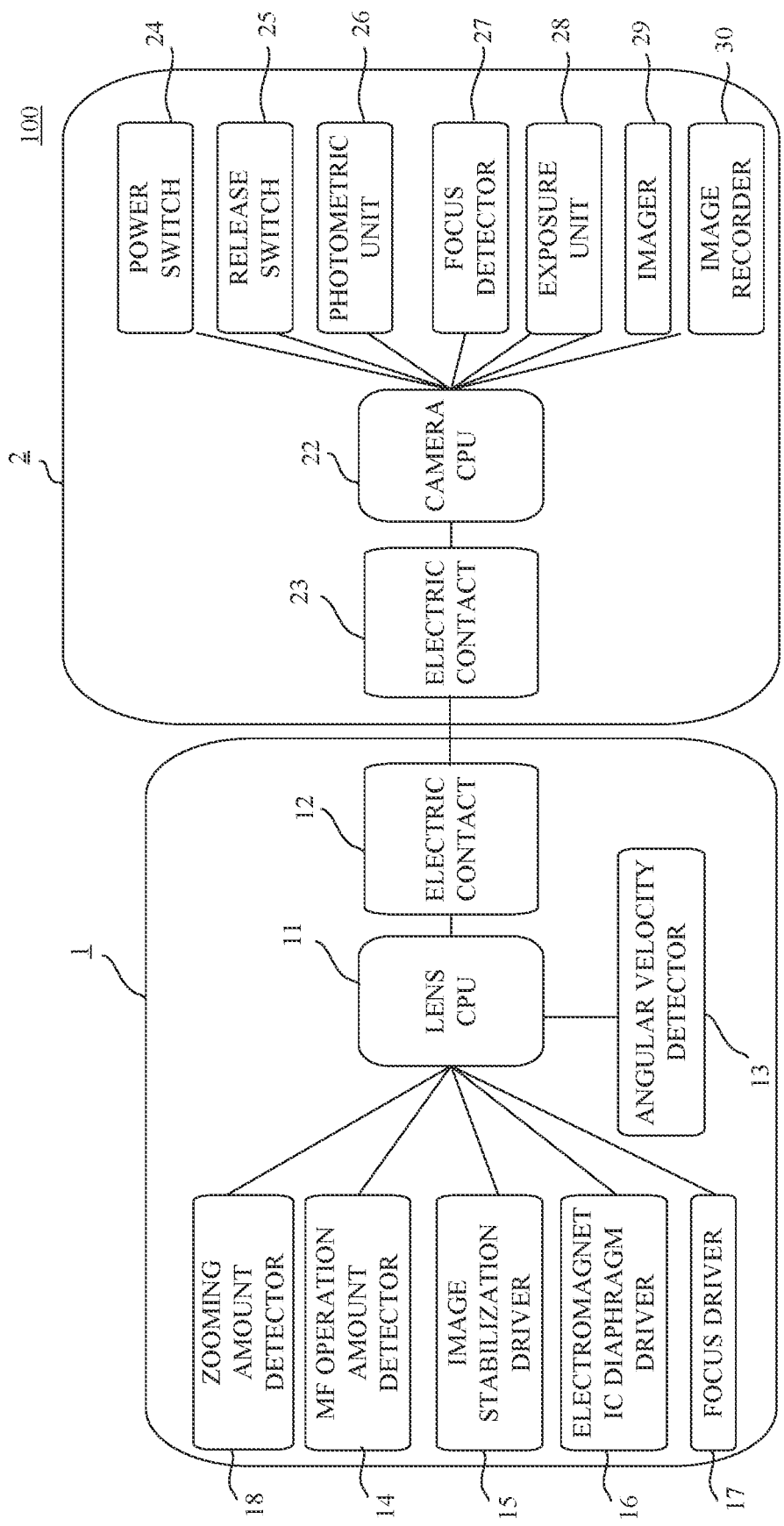
FIG. 2 is a block diagram of the camera system according to the first embodiment.

Referring now to FIGS. 1 and 2, a description will be given of a camera system (imaging system) 100 according to a first embodiment of the present invention. The camera system 100 includes a camera body 2 and an interchangeable lens (lens apparatus) 1 that is attachable to and detachable from the camera body 2.

FIG. 1 is a schematic view of the camera system 100. The interchangeable lens 1 supports an unillustrated imaging optical system and has a structure for driving at least part of optical elements in the imaging optical system. The camera body 2 has an image sensor 21. The interchangeable lens 1 and the camera body 2 are mechanically integrated by an unillustrated mount. A luminous flux from an object is imaged on the image sensor 21 by the imaging optical system of the interchangeable lens 1. The interchangeable lens 1 and the camera body 2 are electrically connected by an electric contact described later, and the interchangeable lens 1 and the camera body 2 communicate with each other to take a photo. The image sensor 21 is a solid-state image sensor such as a CMOS sensor that converts a charge amount generated in proportion to a light amount incident on pixels into a voltage signal, and takes an image formed by the imaging optical system of the interchangeable lens 1. Reference numeral L101 denotes a focus lens which is an optical element configured to form part of an imaging optical system. By moving the focus lens L101 back and forth along an optical axis OA, an object from a short distance to infinity can be imaged by the image sensor 21.

FIG. 2 is a block diagram of the camera system 100. A camera CPU 22 includes a microcomputer and controls the operation of each component in the camera body 2. When the interchangeable lens 1 is attached, the camera CPU 22 communicates with a lens CPU 11 provided in the interchangeable lens 1 via an electric contact 12 on the interchangeable lens side and an electric contact 23 on the camera body side. Information transmitted from the camera CPU 22 to the lens CPU 11 includes driving amount information of the focus lens L101 and the like. Information transmitted from the lens CPU 11 to the camera CPU 22 includes image magnification information and the like. The electric contacts 12 and 23 also include a contact for supplying power from the camera body 2 to the interchangeable lens 1.

A power switch 24 is a switch that can be operated by the photographer to start the camera CPU 22 and to start supplying power to actuators, sensors, and the like in the camera system. A release switch 25 is a switch that can be operated by the photographer, and includes a first stroke switch SW1 and a second stroke switch SW2. A signal from the release switch 25 is input into the camera CPU 22. The camera CPU 22 enters an imaging preparation state in response to the input of the ON signal from the first stroke switch SW1. In the imaging preparation state, a photometric unit 26 measures the object brightness and a focus detector 27 performs a focus detection.

The camera CPU 22 calculates an aperture value (F-number) of an unillustrated diaphragm (aperture stop) unit mounted in the interchangeable lens 1 and an exposure amount (shutter seconds) of the image sensor 21 based on the photometric result. The camera CPU 22 determines a driving amount of the focus lens L101 in order to obtain an in-focus state for the object based on the focus information of the imaging optical system by the focus detector 27. Driving amount information (focus lens driving amount information) is transmitted to the lens CPU 11. The lens CPU 11 controls the operation of each component in the interchangeable lens 1. When the ON signal from the second stroke switch SW2 is input, the camera CPU 22 transmits a diaphragm driving command to the lens CPU 11 to set to the diaphragm unit the aperture value calculated as described above.

The camera CPU 22 transmits an exposure starting command to an exposure unit 28 for a retracting operation of an unillustrated mirror, an opening operation of an unillustrated shutter, and an exposure operation of an object image using an imager 29 including the image sensor 21. The imaging signal from the imager 29 (image sensor 21) is converted into a digital signal by the signal processor in the camera CPU 22, receives various correction processes, and is output as an image signal. The image signal data is written and stored in an image recorder 30 in a semiconductor memory such as a flash memory or a recording medium such as a magnetic disk or an optical disc.

A zooming amount detector 18 detects a rotation of an unillustrated zoom ring by an unillustrated sensor. An MF operation amount detector 14 detects a rotation of an unillustrated manual focus ring by an unillustrated sensor. An image stabilization driver 15 includes a driving actuator of an unillustrated image stabilizer and a driving circuit thereof. An electromagnetic diaphragm driver 16 brings the diaphragm unit into an open state corresponding to a specified aperture value by the lens CPU 11 that receives a diaphragm driving command from the camera CPU 22. The focus driver 17 drives the focus lens L101 by an unillustrated focus driver according to focus driving amount information transmitted from the camera CPU 22.

An angular velocity detector 13 includes an unillustrated angular velocity sensor. The angular velocity detector 13 detects shakes in a pitch direction (vertical rotation) and shakes in a yaw direction (horizontal rotation), which are angular velocities using the angular velocity sensor, and outputs the respective angular velocities to the lens CPU 11. The lens CPU 11 integrates the angular velocity signals in the pitch direction and the yaw direction from the angular velocity sensor, and calculates an angular displacement amount in each direction. Then, the lens CPU 11 controls the image stabilization driver 15 according to the above angular displacement amounts in the pitch direction and the yaw direction so as to perform the image stabilization.

Figure 3A:
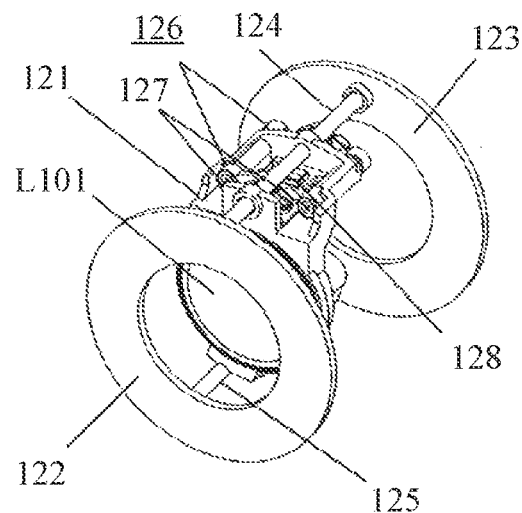
FIGS. 3A and 3B are structural diagrams of a linear motion guiding mechanism according to the first embodiment.
Figure 3B:
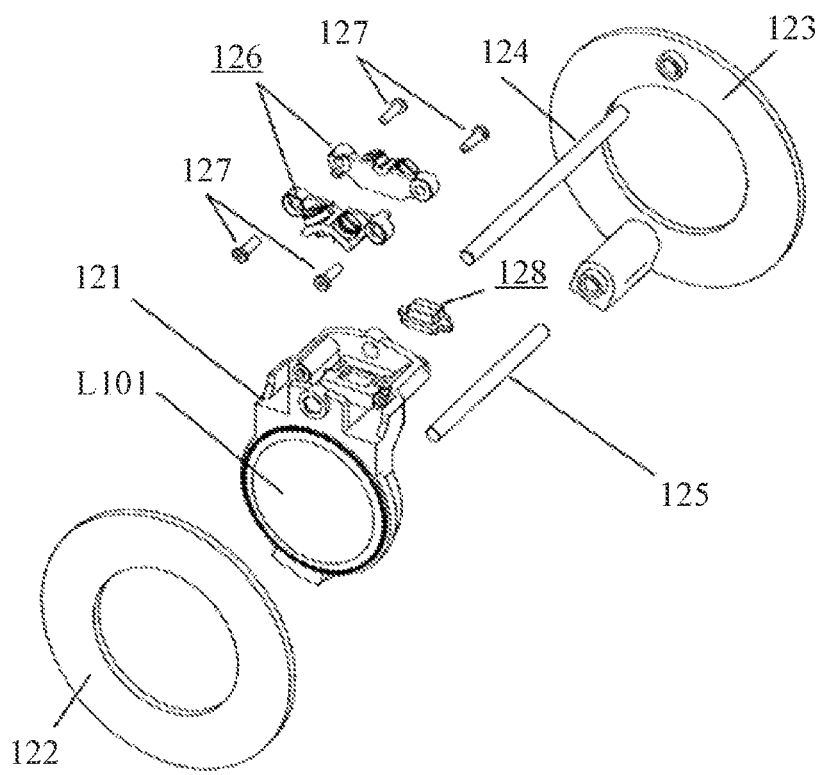

Referring now to FIGS. 3A and 3B, a description will be given of a structure of a linear motion guiding mechanism of the focus lens L101 according to this embodiment. FIGS. 3A and 3B are structural diagrams of the linear motion guiding mechanism according to this embodiment. As described above, the focus lens L10 is driven by the focus driver 17 according to the focus driving amount information transmitted from the camera CPU 22. A description of a specific structure of the focus driver 17 will be omitted. The focus driver 17 may use a stepping motor, a so-called VCM including a magnetic circuit and a field coil, or anything as long as it that can drive the focus lens L101 by generating a driving force. In FIGS. 3A and 3B, some detailed shapes that do not directly relate to the present invention will be omitted.

FIG. 3A is a general perspective view of the linear motion guiding mechanism, and FIG. 3B is an exploded perspective view of the linear motion guiding mechanism. The focus lens L101 is an optical element that constitutes all or part of the optical system. Reference numeral 121 denotes a movable barrel (movable member) that holds the optical element. Reference numeral 122 denotes a front fixed frame (fixed member) that serves as a base for movements of the movable barrel 121 in the optical axis direction, and reference numeral 123 denotes a rear fixed frame (fixed member). The movable barrel 121 moves in the optical axis direction relative to the front fixed frame 122 and the rear fixed frame 123.

Reference numeral 124 denotes a main guide bar (main guide member) that guides a movement (linear movement) of the movable barrel 121. The main guide bar 124 includes a cylindrical member having a specific shape in a section orthogonal to the direction of linear movement. In this embodiment, the specific shape is a circular shape (cylindrical rod), but the specific shape is not limited to this example. In this embodiment, the main guide bar 124 includes a magnetic material (soft magnetic material). SUS 430 and the like are suitable for the main guide bar 124 because of its high corrosion resistance, no surface treatment necessary, good workability, and high mechanical accuracy such as roundness, straightness, and surface roughness. Reference numeral 125 denotes a sub guide bar (sub guide member) formed as a cylindrical rod in this embodiment by extending the same sectional shape fixed to the front fixed frame 122 and the rear fixed frame 123 in parallel with the main guide bar 124. The sub guide bar 125 is fixed to the front fixed frame 122 and the rear fixed frame 123, and disposed along the main guide bar 124. Here, the front fixed frame 122 and the rear fixed frame 123 are expressed as independent members, but they may be positioning members that accurately hold both ends of the main guide bar 124 and the sub guide bar 125 that guide the movement of the movable barrel 121 parallel to the optical axis OA. Therefore, either the front fixed frame 122 or the rear fixed frame 123 may have an unillustrated shape that extends in the optical axis direction so as to cover the outside of the movable barrel 121, and both may be accurately integrated with each other by fastening screws or the like.

Reference numeral 126 denotes a first linear motion guiding unit (first support member) and a second linear motion guiding unit (second support member) spaced from each other in the optical axis direction (direction of linear motion of the movable barrel 121), which are integrated with the movable barrel 121 by fastening screws 127. The detailed configuration of the linear motion guiding unit 126 will be described later. Reference numeral 128 denotes a two-pole magnet unit, which is integrated with the movable barrel 121. This constitutes an energizer (urging member or biasing member) in cooperation with the main guide bar 124, which will be described in detail later.

Referring now to FIGS. 4A to 4C, a description will be given of the structure of the linear motion guiding unit 126. FIGS. 4A to 4C are structural diagrams of the linear motion guiding unit, FIG. 4A is a front view, FIG. 4B is an exploded perspective view, and FIG. 4C is a sectional view of principal part.

Reference numeral 129 denotes a support base. Reference numeral 130 denotes a ball bearing (a pair of rotating elements). As is well known, the ball bearing 130 includes an inner ring 130a, an outer ring 130b, a ball and a holder 130c. Since the outer ring 130b rotates relative to the inner ring 130a as the ball and the ball of the holder 130c roll, its driving resistance is extremely small. The detailed internal structure of the ball bearing 130 will be omitted in the sectional view.

Reference numeral 131 denotes a shaft screw. The shaft screw 131 includes a screw head 131a, a shaft portion 131b, and a screw portion 131c. Reference numeral 132 denotes a hexagon nut. The shaft portion 131b is engaged with the inner ring 130a of the ball bearing 130 and the hole portion 129a of the support base 129, and the screw portion 131c is screwed and tightened with the hexagon nut 132 to fix the inner ring 130a of the ball bearing 130 to a predetermined position of the support base 129. Reference numeral 133 denotes a metal washer. A molded product of a thermoplastic resin such as polycarbonate is suitable for the support base 129. In tightening and fixing the inner ring 130a to the support base 129 with the screw head 131a, the metal washer 133 is interposed to steadily fix the inner ring 130a and to prevent its sinking.

Referring now to FIG. 4C, a description will be given of a relationship between the main guide bar 124 and the two ball bearings 130. Reference numeral 130d denotes rotational axes of the two ball bearings. As described above, the main guide bar 124 is supported by the front fixed frame 122 and the rear fixed frame 123 in parallel with the optical axis OA. FIG. 4C is a sectional view taken along a plane perpendicular to the optical axis OA including the rotational axes 130d of the two ball bearings 130 where the two ball bearings 130 and the main guide bar 124 contact each other.

The rotational axis 130d is located in a plane perpendicular to the optical axis OA. Thus, a first plane 130e and a second plane 130f perpendicular to the respective rotational axes 130d of the pair of ball bearings 130 are parallel to the moving direction of the movable barrel 121 and intersect with each other (at an intersection P). That is, the first plane 130e and the second plane 130f respectively orthogonal to the pair of rotational axes of the pair of ball bearings 130 are along the direction of linear motion and intersect with each other. For easier understanding, since the outer circumference surfaces of the outer rings 130b of the two ball bearings 130 contact the main guide bar 124 with angles, the stable support and guidance are available.

In this embodiment, the angle which the outer ring 130b of each of the two ball bearings 130 and the main guide bar 124 form is 120 degrees, but the angle is not limited to this value, and may be another angle. In this embodiment, the rotational axes 130d of the two ball bearings 130 are disposed at the same position in the optical axis direction, but may shift from each other in the optical axis direction.

Figure 5A:
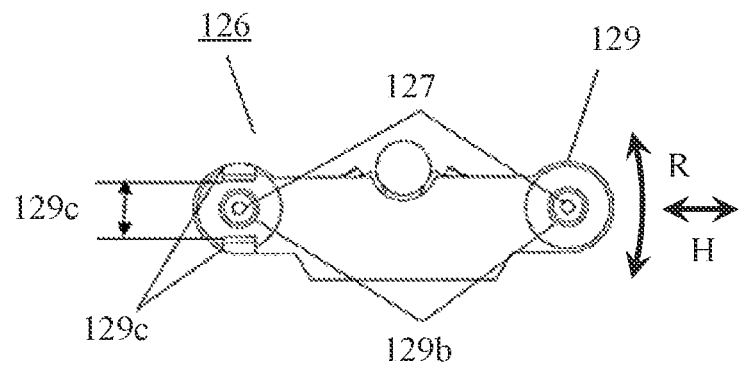
FIGS. 5A and 5B are explanatory diagrams of a relationship between the linear motion guiding unit and a movable barrel in the first embodiment.
Figure 5B:
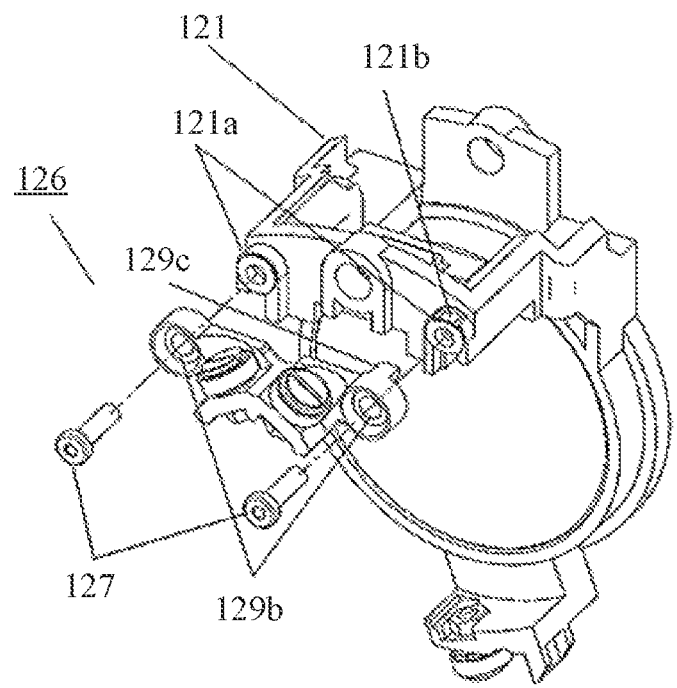

Referring now to FIGS. 5A and 5B, a description will be given of a relationship between the first linear motion guiding unit 126 and the movable barrel 121. FIGS. 5A and 5B are explanatory diagrams of the relationship between the first linear motion guiding unit 126 and the movable barrel 121. FIG. 5A is a rear view corresponding to the front view of the linear motion guiding unit 126 of FIG. 4A, and FIG. 5B is an explanatory view of the relationship with the movable barrel 121.

The support base 129 has through-holes 129b for fixing the movable barrel 121 with the fastening screws 127. There is a diameter difference between the outer diameter of the fastening screw 127 and the inner diameter of the through-hole 129b, and a necessary and sufficient gap is provided. Reference numeral 121a denotes a guide unit attachment portion having an attachment surface of the linear motion guiding unit 126 and a hole portion screwed with the fastening screw 127. A reference protrusion 129c is provided on the rear portion of the support base 129, and forms a parallel wall having a width 129c. The movable barrel 121 has a reference cylindrical portion 121b corresponding to the reference projection 129c, and the reference projection 129c and the reference cylindrical portion 121b are engaged with each other. Therefore, when the linear motion guiding unit 126 is incorporated into the movable barrel 121, there is a degree of freedom in the attachment position of a translation H and a rotation R indicated by arrows on the basis of the reference cylindrical portion 121b. That is, the linear motion guiding unit 126 has a degree of freedom of a fixed position in a plane orthogonal to the direction of linear motion, and the arrangement of the focus lens L101 is determined by the fixed position of the linear motion guiding unit 126. The arrangement of the focus lens L101 includes a state of tilt eccentricity and a state of parallel eccentricity of the focus lens L101.

Referring now to FIGS. 6A to 6H, a description will be given of the assembled structures of the first linear motion guiding unit and the second linear motion guiding unit for accurately holding and guiding the focus lens L101 held by the movable barrel 121 while suppressing the tilt and eccentricity. FIGS. 6A to 6H are explanatory diagrams of the assembled structure of the linear motion guiding unit.

Figure 6A:
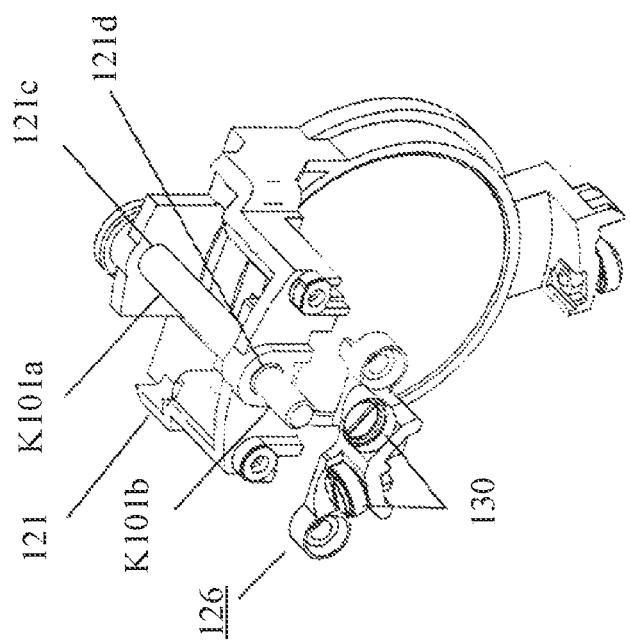
FIGS. 6A to 6H are explanatory diagrams of an assembled structure of the linear motion guiding unit according to the first embodiment.

FIG. 6A is a perspective view of the movable barrel 121 and the assembly reference axis. Reference numeral K101 denotes a first assembly reference axis. The first assembly reference shaft K101 includes a first shaft portion K101a, a second shaft portion K101b, and a flange portion K101c, and each portion is machined with high coaxial degree by a lathe or the like. Reference numerals 121c and 121d are reference holes having a reference shape for determining the fixed positions of the first support member and the second support member provided on the movable barrel 121. In this embodiment, the reference holes 121c and 121d have the same diameter, but the diameter is not limited to this example.

In this embodiment, the reference holes 121c and 121d are formed with high accuracy relative to the holder of the focus lens L101 in the movable barrel 121. The first shaft portion K101a of the first assembly reference shaft K101 has the same diameter as the diameters of the reference holes 121c and 121d of the movable barrel 121, and the second shaft portion K101b has the same diameter as that of the main guide bar 124.

Figure 6B:
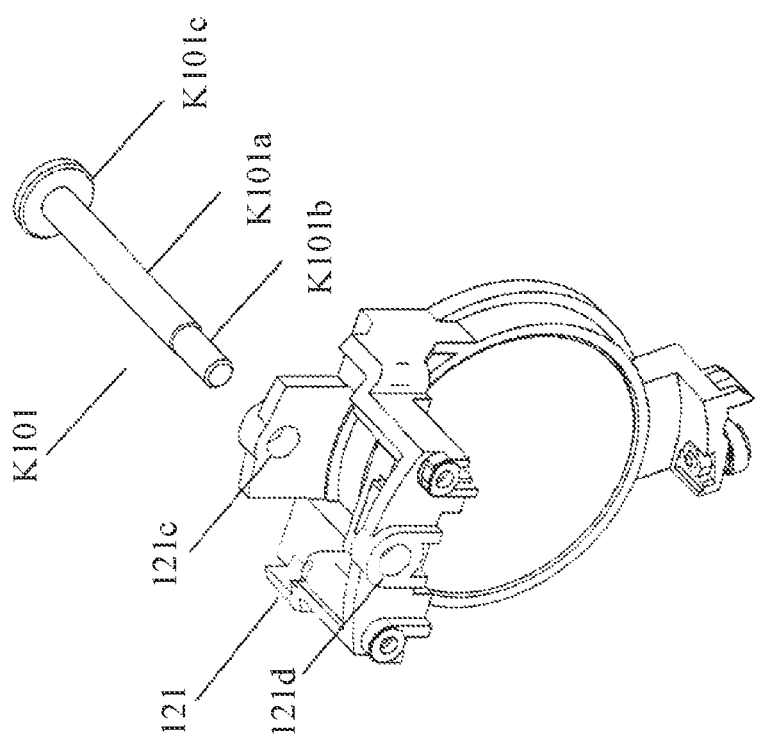

FIG. 6B is a perspective view of the movable barrel 121 into which the first assembly reference shaft K101 has been inserted before the first linear motion guiding unit 126 is assembled. Since the reference holes 121c and 121d of the movable barrel 121 are coaxially formed and the first shaft portion K101a of the first assembly reference shaft K101 is engaged with both the reference holes 121c and 121d, the second shaft portion K101b is positioned as equivalently as the main guide bar 124. By bringing the two ball bearings 130 of the linear motion guiding unit 126 into contact with the second shaft portion K101b and incorporating the linear motion guiding unit 126 into the movable barrel 121, the state can be made as equivalently as the state of the linear motion guiding unit 126 relative to the main guide bar 124 in FIG. 3A.

Figure 6C:
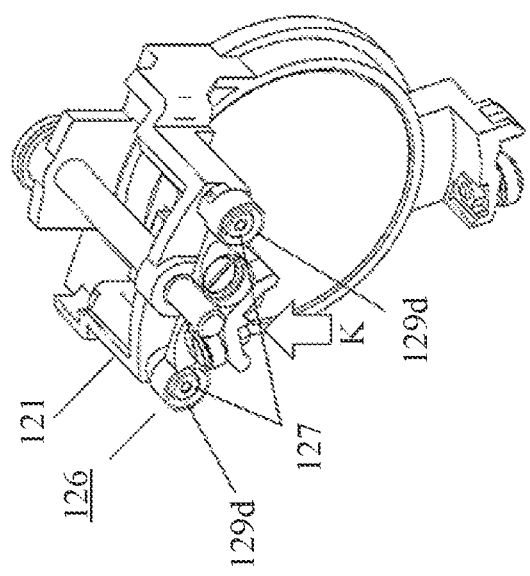
Figure 6D:
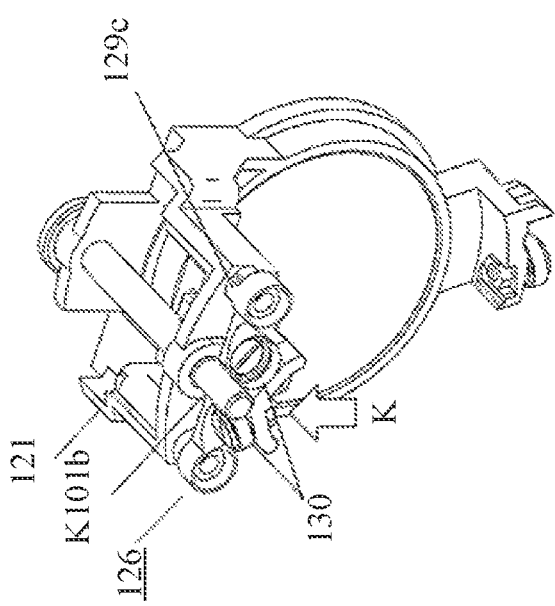
Figure 6E:
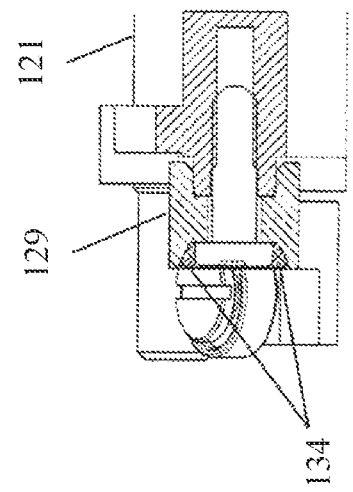
Figure 6F:
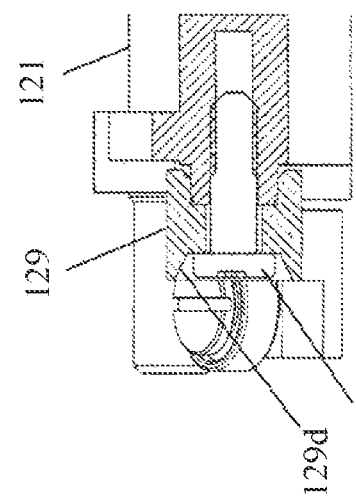

FIG. 6C is a perspective view of the determined state of the assembled position of the linear motion guiding unit 126 into the movable barrel 121. The movable barrel 121 and the first assembly reference shaft K101 are properly fixed by an unillustrated jig. In the linear motion guiding unit 126, the reference protrusion 129c and the reference cylindrical portion 121b (see FIG. 5B) are engaged with each other and pressed against the movable barrel 121 by the unillustrated jig. In this state, the two ball bearings 130 are brought into contact with the second shaft portion K101b in an arrow K direction from the bottom. While this state is maintained, the fastening screws 127 are screwed into the movable barrel 121 as illustrated in FIG. 6D, and the linear motion guiding unit 126 is fixed at a proper position relative to the main guide bar 124. FIGS. 6E and 6F are sectional views of part where the linear motion guiding unit 126 and the movable barrel 121 are connected with each other by the fastening screws 127. The screwed part of the support base 129 has an edge portion 129d having a conical inner circumference, and forming, as illustrated in FIG. 6E, a substantially triangular space with the screw head of the fastening screw 127. Filling the entire circumference of this space with a gap filling adhesive 134 and curing it can serve to positively prevent a positional shift between the linear motion guiding unit 126 and the movable barrel 121. The adhesive 134 can effectively use a UV adhesive or the like that is curable in a short time by ultraviolet irradiations.

Figure 6G:
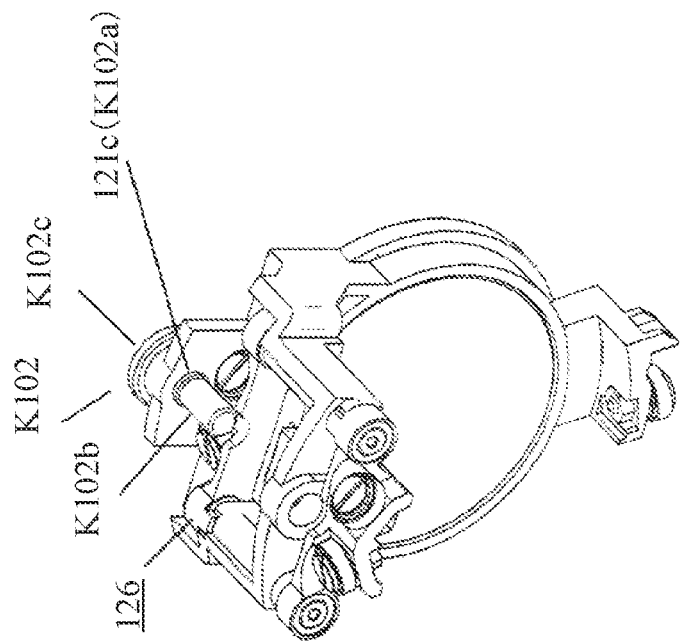
Figure 6H:
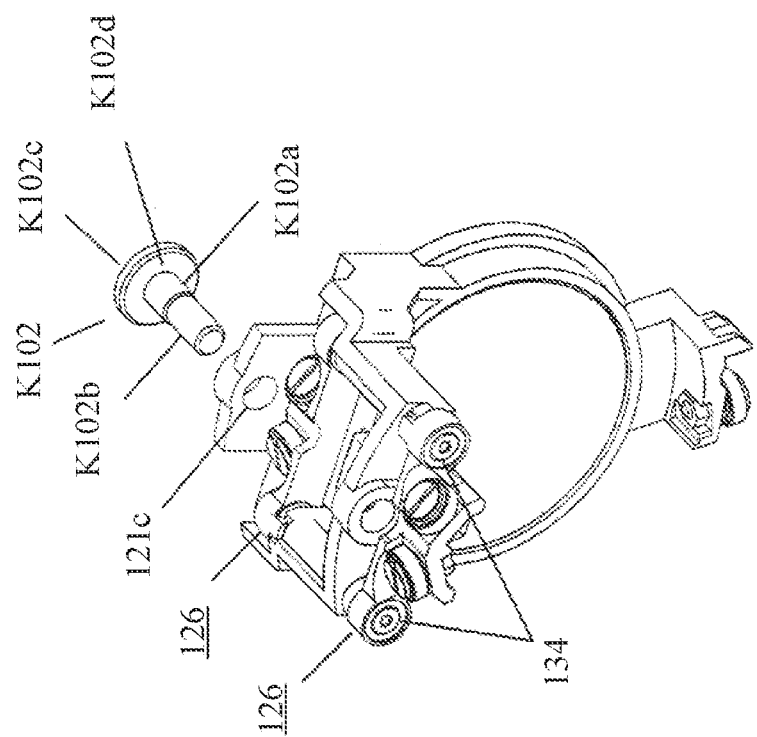

FIGS. 6G and 6H illustrate the procedure for incorporating the second linear motion guiding unit 126. Reference numeral K102 denotes a second assembly reference shaft. The second assembly reference shaft K102 includes a first shaft portion K102a, a second shaft portion K102b, a flange portion K102c, and a flange portion K102d, and each portion is machined with high coaxial degree and straightness by a lathe or the like. The first shaft portion K102a of the second assembly reference shaft K102 has the same diameter as that of the reference hole 121c of the movable barrel 121, and the second shaft portion K102b has the same diameter as that of the main guide bar 124.

FIG. 6H is a perspective view of the movable barrel 121 into which the second assembly reference shaft K102 has been inserted before the second linear motion guiding unit 126 is fixed. Since the second linear motion guide shaft 126 cannot be assembled when the second assembly reference shaft K102 is inserted, it is maintained at a predetermined position in advance. By engaging the first shaft portion K102a with the reference hole 121c and by bringing the flange portion K102d into contact with the surface perpendicular to the reference hole 121c in the movable barrel 121, the second shaft portion K102b is positioned as equivalently as the main guide bar 124. By incorporating the second linear motion guiding unit 126 into the second shaft portion K102b in the same procedure as that of the first linear motion guiding unit 126, the second linear motion guiding unit 126 is fixed at the proper position relative to the main guide bar 124.

Figure 7A:
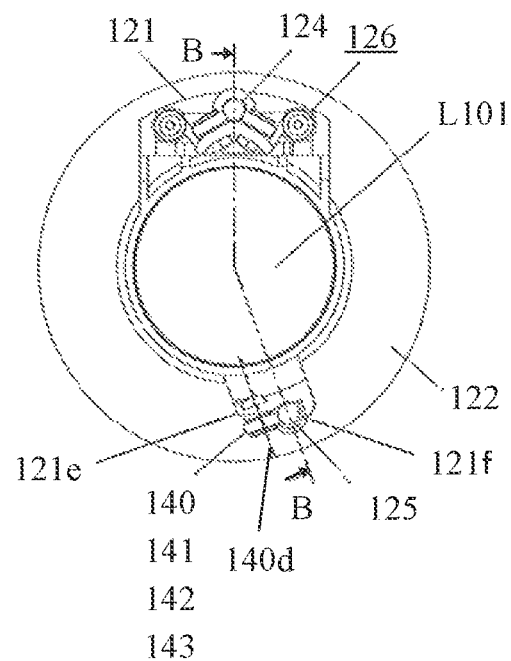
FIGS. 7A and 7B are explanatory views around a main guide bar and a sub guide bar in the first embodiment.
Figure 7B:
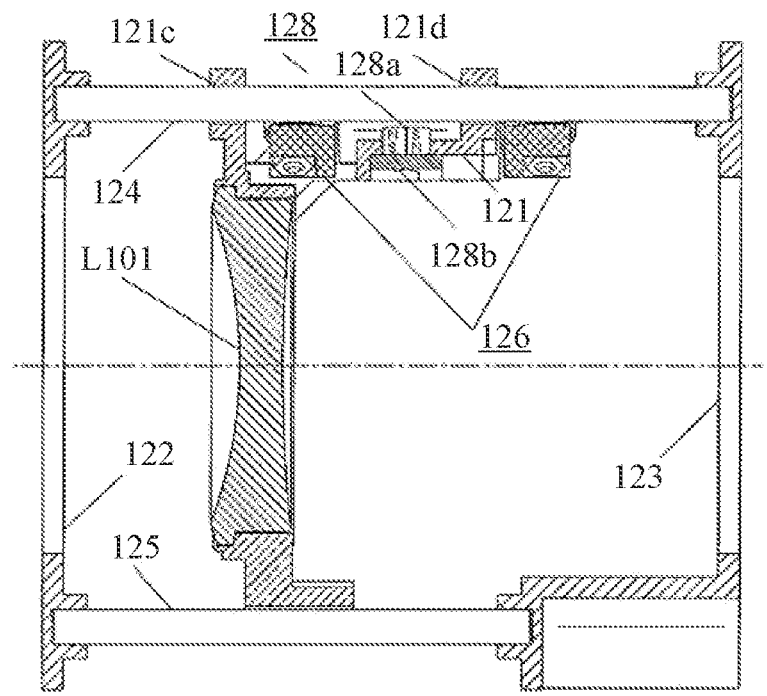

Referring now to FIGS. 7A and 7B, a description will be given of the structure around the main guide bar 124 and the sub guide bar 125. FIGS. 7A and 7B are explanatory views around the main guide bar 124 and the sub guide bar 125. FIG. 7A is a rear view of the linear motion guiding mechanism of the focus lens L101 viewed from the rear fixed frame 123 side. For explanation convenience, the rear fixed frame 123 will be omitted. FIG. 7B is a sectional view taken along a line B-B passing through the centers of the main guide bar 124, the focus lens L101, and the sub guide bar 125 in FIG. 7A.

Referring now to FIG. 7B, a description will be given of the biasing member that brings two sets of pair of rotating elements and the main guide member into contact with each other. The main guide bar 124 is a main guide member made of a soft magnetic material, and the two-pole magnet unit 128 is a supporting permanent magnet including a permanent magnet 128a magnetized in two poles in the optical axis direction and a back yoke 128b. Although the detailed shape will be omitted, the back yoke 128b is fixed to the movable barrel 121 by a sandwiching structure. The permanent magnet 128a is magnetically attracted and bonded to the back yoke 128b, but is more firmly integrated with the movable barrel 121 by the additional adhesion or the like. Due to the magnetic attraction between the main guide bar 124 and the two-pole magnet unit 128, four or the two pairs of ball bearings 130 contact (bias) the main guide bar 124 as illustrated in FIG. 4C so that the linear movement of the movable barrel 121 can be guided in the optical axis direction.

In FIG. 7A, the ball bearing 140 contacts the sub guide bar 125. In this embodiment, the ball bearing 140 is incorporated into a portion 121e of the movable barrel 121 with the shaft screw 141, the hexagon nut 142, and the metal washer 143 in the same structure as the ball bearing 130 incorporated in the linear motion guiding unit 126. The ball bearing 140 is a second rotating element. The plane perpendicular to the rotational axis 140d of the ball bearing 140 is parallel to the moving direction of the movable member. That is, the plane orthogonal to the rotational axis of the ball bearing 140 for the restriction of the rotation is along the direction of the linear movement. This embodiment expressly illustrates a second biasing member that energizes or brings the second rotating element and the sub guide member into contact with each other. As described above, the movable barrel 121 receives a counterclockwise torque from the focus driver to the main guide bar 124, and the outer ring 140b of the ball bearing 140 contacts and is guided on the sub guide bar 125.

Reference numeral 121f denotes a dropout preventive wall provided on the opposite side of the ball bearing 140 with respect to the sub guide bar 125. When the ball bearing 140 contacts the sub guide bar 125, the dropout preventive wall 121f has a gap with the sub guide bar 125, and acts as a stopper when the movable barrel 121 receives a clockwise torque. In FIG. 7B, a gap is provided between the reference holes 121c and 121d and the main guide bar 124 in a normal state, and serves as a stopper when an external impact force or the like is applied.

In this embodiment, the linear motion guiding unit (first linear motion guiding unit and second linear motion guiding unit) 126 is fixed to the movable barrel 121 with accuracy on the basis of on the reference holes 121c and 121d. However, the ball bearing 140 that determines the angular position around the main guide bar 124 includes various positional error factors, the focus lens L101 is decentered within a permissible range according to the positional relationship between the main guide bar 124 and the sub guide bar 125.

In this embodiment, the linear motion guiding unit (first linear motion guiding unit and second linear motion guiding unit) 126 is fixed to the movable barrel 121, and the main guide bar 124 is fixed to the front fixed frame 122 and the rear fixed frame 123, but the present invention is not limited to this embodiment. The linear motion guiding unit 126 may be fixed to the front fixed frame 122 and the rear fixed frame 123, and the main guide bar 124 may be fixed to the movable barrel 121. That is, the first linear motion guiding unit and the second linear motion guiding unit are fixed to one of the movable member (movable barrel 121) and the fixed member (front fixed frame 122, rear fixed frame 123), and the main guide bar 124 may be fixed to the other of the movable member and the fixed member. This is similarly applied to other embodiments.

Second Embodiment

Figure 8A:
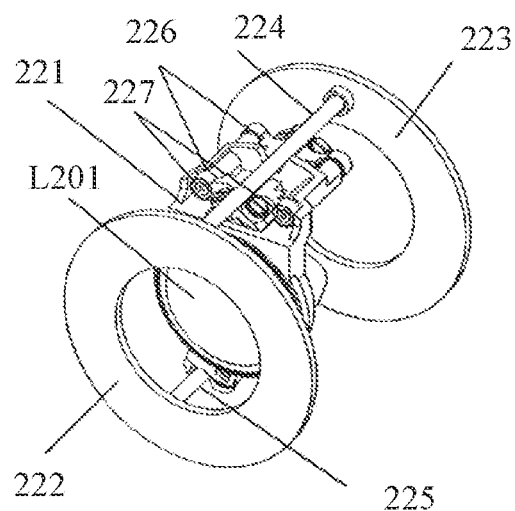
FIGS. 8A and 8B are structural diagrams of a linear motion guiding mechanism according to a second embodiment.
Figure 8B:
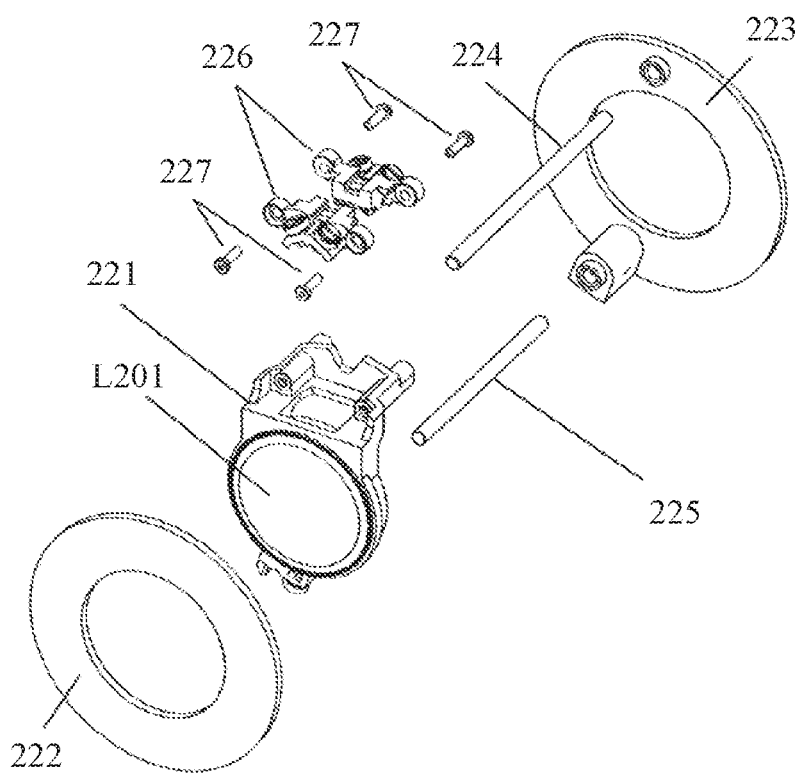

Next follows a description of a linear motion guiding mechanism (focus linear motion guiding mechanism) according to a second embodiment of the present invention. FIGS. 8A and 8B are structural diagrams of the linear motion guiding mechanism according to this embodiment. Similar to the first embodiment, the structure of the focus driver will be omitted. FIG. 8A is a general perspective view of the linear motion guiding mechanism, and FIG. 8B is an exploded perspective view of the linear motion guiding mechanism. A focus lens L201 is an optical element that forms all or part of the optical system, reference numeral 221 denotes a movable barrel (movable member) that holds the optical element, reference numeral 222 denotes a front fixed frame (fixed member) that serves as a base for a movement of the movable barrel 221 in the optical axis direction, and reference numeral 223 denotes a rear fixed frames (fixed member). The movable barrel 221 moves in the optical axis direction relative to the front fixed frame 222 and the rear fixed frame 223. Reference numeral 224 denotes a main guide bar (main guide member) that extends the same sectional shape and guides the movement of the movable member. Reference numeral 225 is a sub guide bar (sub guide member) formed by extending the same sectional shape fixed to the fixed member in parallel with the main guide bar 224.

In this embodiment, both the main guide bar 224 and the sub guide bar 225 are cylindrical rods and made of a soft magnetic material. SUS 430 and the like are suitable for the main guide bar 224 because of its high corrosion resistance, no surface treatment necessary, good workability, and high mechanical accuracy such as roundness, straightness, and surface roughness. Here, the front fixed frame 222 and the rear fixed frame 223 have unillustrated shapes as in those in the first embodiment, and they are integrated with each other with accuracy by fastening screws or the like, and both ends of the main guide bar 224 and the sub guide bar 225 are accurately positioned so that the main guide bar 224 and the sub guide bar 225 are held parallel to the optical axis. Reference numeral 226 denotes a first linear motion guiding unit (first support member) and a second linear motion guiding unit (second support member) spaced from each other in the optical axis direction, which are integrated with the movable barrel 221 by the fastening screws 227.

Figure 9A:
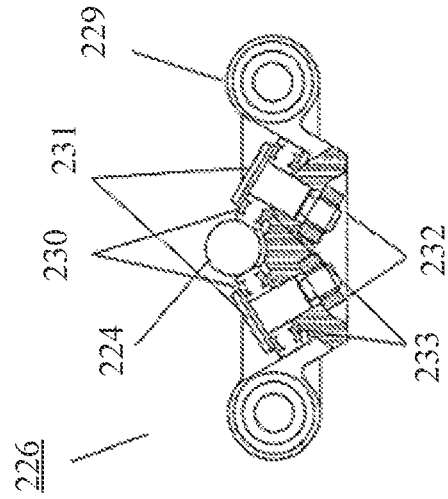
FIGS. 9A to 9D are structural diagrams of a linear motion guiding unit in the second embodiment.
Figure 9B:
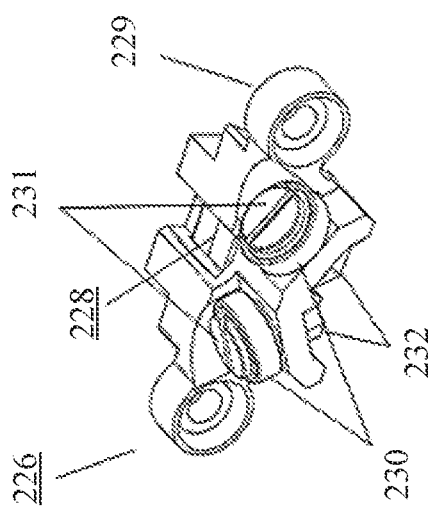
Figure 9C:
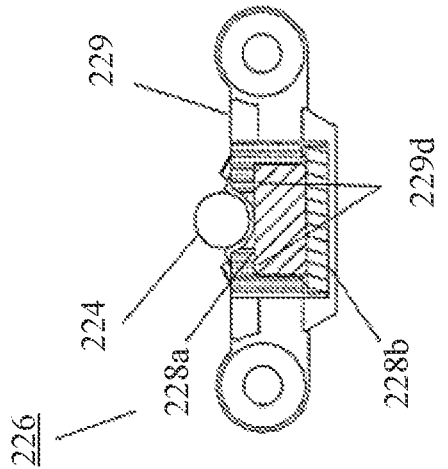
Figure 9D:
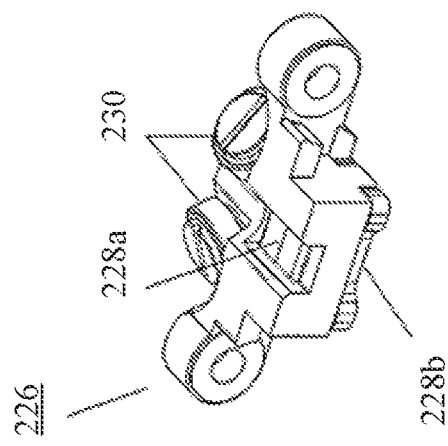

Referring now to FIGS. 9A to 9D, a description will be given of the structure of the linear motion guiding unit 226. FIGS. 9A to 9D are structural diagrams of the linear motion guiding unit 226. FIG. 9A is a perspective view, FIG. 9B is a sectional view of principal part, FIG. 9C is a perspective view viewed from a direction different from that of FIG. 9A, and FIG. 9D is a sectional view of principal part.

Referring numeral 229 denotes a support base, and reference numeral 230 denotes a ball bearing (a pair of rotating elements). Similar to the first embodiment, the ball bearing 230 includes an inner ring, an outer ring, a ball, and a holder, and the driving resistance is extremely small. The detailed internal structure of the ball bearing 230 will be omitted in the sectional view. Reference numeral 231 denotes a shaft screw configured to fix the inner ring of the ball bearing 230 at a predetermined position of the support base 229 via the metal washer 233, when the shaft screw 231 is screwed and tightened with a hexagon nut 232.

FIG. 9B is a sectional view of the linear motion guiding unit 226 on a plane including the rotation axes of the pair of ball bearings 230. Since the relationship between the main guide bar 224 and the ball bearing 230 is the same as the relationship between the main guide bar 124 and the ball bearing 130 in FIG. 4C in the first embodiment, a detailed description thereof will be omitted. Reference numeral 228 denotes a two-pole magnet unit, which is held by the linear motion guiding unit 226.

FIG. 9D is a sectional view at the position of the two-pole magnet unit 228. Reference numeral 228a denotes a permanent magnet magnetized to two poles in the optical axis direction, and reference numeral 228b is a back yoke, which form a supporting permanent magnet. The permanent magnet 228b is fixed while contacting a contact surface 229d of the support base 229. The main guide bar 224 is made of a soft magnetic material and magnetically attracts the two-pole magnet unit 228. Thus, the pair of ball bearings 230 and the main guide bar 224 contact each other to form a biasing member. In this embodiment, the support base 229 has the two-pole magnet unit 228 that is magnetically coupled with the ball bearing 230 that contacts the main guide bar 224. Since a distance between the two-pole magnet unit 228 and the main guide bar 224 is set by the contact surface 229d, a more stable magnetic attraction force can be set.

Referring now to FIGS. 10A to 10C, a description will be given of the structure around the main guide bar 224 and the sub guide bar 225. FIGS. 10A to 10C are explanatory diagrams around the main guide bar 224 and the sub guide bar 225. FIG. 10A is a rear view of the linear motion guiding mechanism of the focus lens L201 viewed from the rear fixed frame 223 side. For explanation convenience, the rear fixed frame 223 will be omitted. FIG. 10B is a perspective view viewed from the sub guide bar 225 side. FIG. 10C is a sectional view taken along a line C-C passing through the centers of the main guide bar 224, the focus lens L201, and the sub guide bar 225 in FIG. 10A.

Referring now to the sectional view of FIG. 10C, a description will be given of the biasing member that brings two sets of pair of rotating elements and the main guide member into contact with each other. The main guide bar 224 is a main guide member made of a soft magnetic material, and the two-pole magnet unit 228 is a supporting permanent magnet including a permanent magnet 228a magnetized in two poles in the optical axis direction and a back yoke 228b is provided in the linear motion guiding unit 226. Due to the magnetic attraction between the main guide bar 224 and the two-pole magnet unit 228, as illustrated in FIG. 9B, four or the two pairs of ball bearings 230 contact (energize) the main guide bar 224 and the linear movement of the movable barrel 221 can be guided in the optical axis direction.

In FIGS. 10A and 10B, the ball bearing 240 contacts the sub guide bar 225. This embodiment incorporates the ball bearing 240 into a portion 221e in the movable barrel 221 with the shaft screw 241, the hexagon nut 242, and the metal washer 243 in the same configuration as that of the ball bearing 230 incorporated in the linear motion guiding unit 226. The ball bearing 240 is a second rotating element. The plane perpendicular to the rotational axis 240d of the ball bearing 240 is parallel to the moving direction of the movable barrel 221. Reference numeral 250 denotes a two-pole magnet unit. Reference numeral 250a is a permanent magnet magnetized to two poles in the optical axis direction, and reference numeral 250b is a back yoke, which form a permanent magnet. In the permanent magnet 250a, the back yoke 250b is held by a sandwiching portion 221g of the movable barrel 221. The permanent magnet 250a is magnetically attracted and bonded to the back yoke 250b, but is more firmly integrated with the movable barrel 221 due to the additional adhesion or the like.

The sub guide bar 225 contains a magnetic material (soft magnetic material) and magnetically attracts the two-pole magnet unit 250. Therefore, the ball bearing 240 and the sub guide bar 225 contact each other to form the second biasing member. Reference numeral 221F is a dropout preventive wall provided on the opposite side of the ball bearing 240 with respect to the sub guide bar 225. When the ball bearing 240 contacts the sub guide bar 225, the dropout preventive wall 221f has a gap with the sub guide bar 225 and serves as a stopper when the movable barrel 221 receives a clockwise torque. This embodiment provides no stopper for the main guide bar 224, but the movable barrel 221 may be restricted from moving by the shape of an unillustrated fixed member, and the movable barrel 221 may include a stopper portion as in that in the first embodiment for the main guide bar 224.

Referring now to FIGS. 11A to 11E, a description will be given of the assembled structure of the linear motion guiding unit 226 for suppressing the tilt and eccentricity of the focus lens L201 held by the movable barrel 221 and accurately holding and guiding the focus lens L201.

Figure 11A:
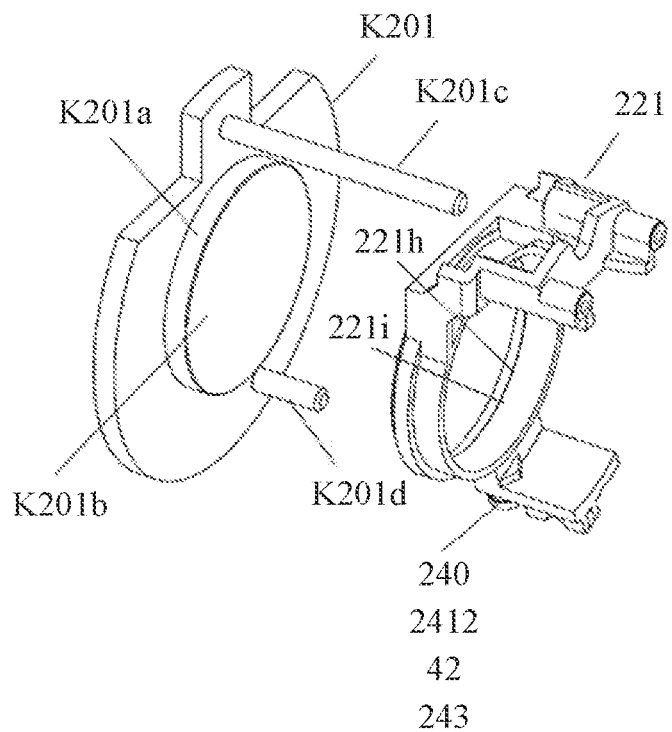
FIGS. 11A to 11E are explanatory diagrams of an assembled structure of the linear motion guiding unit according to the second embodiment.

FIG. 11A is a perspective view of the movable barrel 221 and the assembly reference member. The ball bearing 240 is incorporated in the movable barrel 221 and the focus lens L201 is not incorporated. Reference numeral 221h denotes a lens engagement diameter with which the focus lens L201 is engaged, and reference numeral 221i denotes a lens contact surface of the focus lens L201 in the optical axis direction. A centerline of the lens engagement diameter 221h and the lens contact surface 221i are orthogonal to each other. Reference numeral K201 denotes the assembly reference member. Reference numeral K201a denotes a cylindrical portion having the same diameter as that of the lens engagement diameter 221h, and reference numeral K201b denotes a contact surface which the lens contact surface 221i contacts. The centerline of the cylindrical portion K201a and the contact surface K201b are orthogonal to each other. Reference numeral K201c denotes a main reference axis having the same position and shape as those of the main guide bar 224 in the focus linear motion guiding mechanism. Reference numeral K201d denotes a sub reference axis having the same position and shape as those of the sub guide bar 225.

Figure 11B:
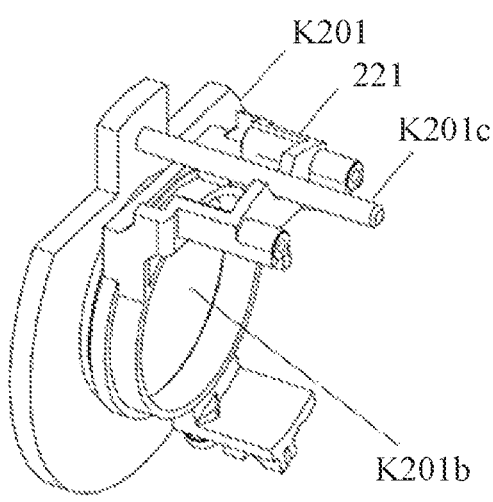
Figure 11C:
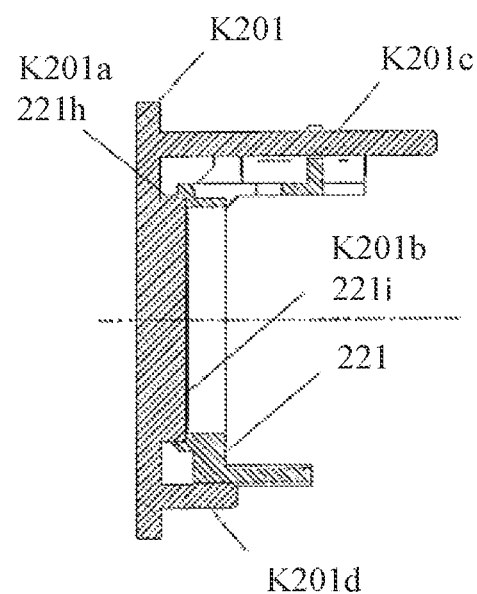

FIG. 11B is a perspective view of a combined state of the assembly reference member K201 and the movable barrel 221. In them, a cylindrical portion K201a and a lens engagement diameter 221h are engaged with each other, and a contact surface K201b and a lens contact surface 221i contact each other. FIG. 11C is a sectional view of FIG. 11B at the centerline of the main reference axis K201c, the centerline of the cylindrical portion K201a, and the centerline of the sub reference axis K201d. The movable barrel 221 and the assembly reference member K201 are properly held while the contact surface K201b and the lens contact surface 221i contact each other by an unillustrated jig, and the cylindrical portion K201a and the lens engagement diameter 221h are rotatable relative to each other. In this embodiment, the lens engagement diameter 221h of the movable barrel 221 and the lens contact surface 221i are reference shapes for determining the fixed positions of the first and second support portions. Since the lens engagement diameter 221h and the lens contact surface 221i are accurate portions that hold the focus lens L201.

Figure 11D:
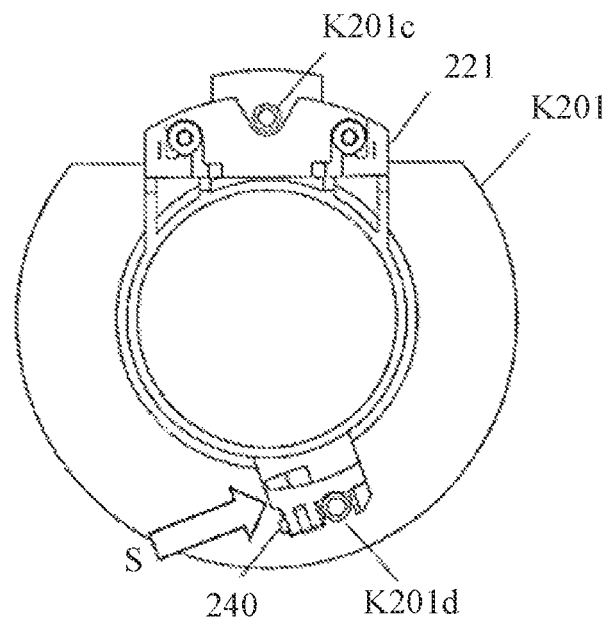
Figure 11E:
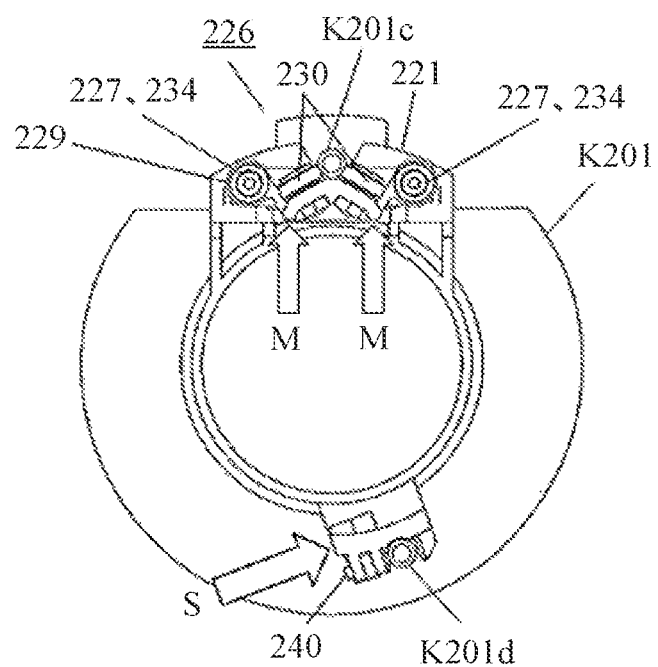

FIG. 11D is a plan view in the same state as that in FIG. 11B. The movable barrel 221 receives an illustrated arrow S force, and the ball bearing 240 and the sub reference shaft K201d contact each other. FIG. 1E is an explanatory diagram of assembling the linear motion guiding unit (first linear motion guiding unit and second linear motion guiding unit) 226. While the state where the ball bearing 240 contacts the sub reference shaft K201d is maintained, the linear motion guiding unit 226 is incorporated into the movable barrel 221 in the same procedure as that in the first embodiment. As illustrated in the figure, the support base 229 is fixed to the movable barrel 221 with the fastening screw 227 while the pair of ball bearings 230 are brought into contact with the main reference shaft K201c by the arrow M force applied to the linear motion guiding unit 226. As in the first embodiment, the gap between the support base 229 and the screw head of the fastening screw 227 is filled with a gap filling adhesive 234 and cured.

Even in this embodiment, the ball bearing 240 that determines the angular position around the main guide bar 224 has various position error factors for the lens engagement diameter 221h of the movable barrel 221. However, the ball bearing 240 contacts the sub reference axis K201d by rotating it relative to the centerline of the engagement diameter 221h, and thus the eccentricity amount of the focus lens L201 due to various positional error factors is significantly reduced.

Third Embodiment

Figure 12A:
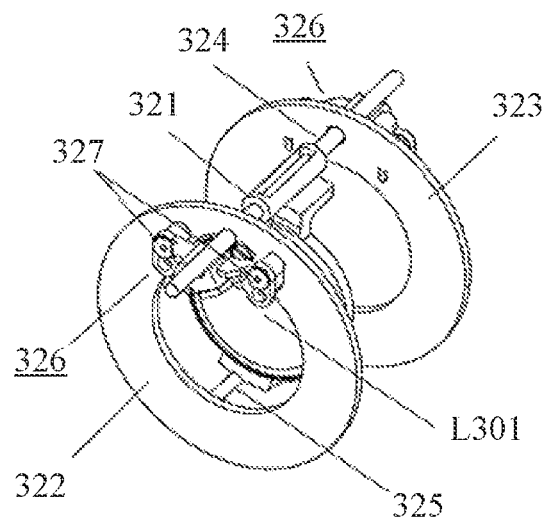
FIGS. 12A and 12B are structural diagrams of a linear motion guiding mechanism according to a third embodiment.
Figure 12B:
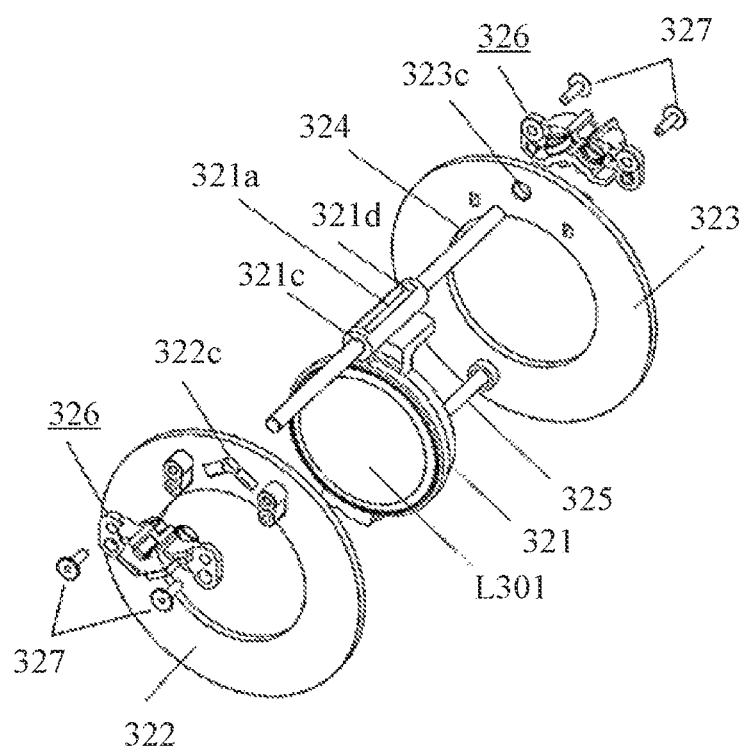

Next follows a description of a linear motion guiding mechanism (focus linear motion guiding mechanism) according to a third embodiment of the present invention. FIGS. 12A and 12B are structural diagrams of a linear motion guiding mechanism according to this embodiment. Similar to the first embodiment, the structure of the focus driver will be omitted. FIG. 12A is a general perspective view of the linear motion guiding mechanism, and FIG. 12B is an exploded perspective view. A focus lens L301 is an optical element that forms all or part of the optical system, reference numeral 321 denotes a movable barrel (movable member) that holds the optical element, reference numeral 322 denotes a front fixed frame (fixed member) that is the basis for a movement of the movable barrel 321 in the optical axis direction, and reference numeral 323 denotes a rear fixed frame (fixed member). The movable barrel 321 moves in the optical axis direction relative to the front fixed frame 322 and the rear fixed frame 323.

Reference numeral 326 denotes a first linear motion guiding unit (first support member) and a second linear motion guiding unit (second support member) that are spaced from each other in the optical axis direction, and integrated with the front fixed frame 322 and the rear fixed frame 323 via fastening screws 327. Reference numeral 322c denotes a reference hole having a reference shape for determining the fixed position of the support member onto the front fixed frame 322. Reference numeral 323c is a reference hole having a reference shape for determining the fixed position of the support member onto the rear fixed frame 323.

Reference numeral 324 denotes a main guide bar (main guide member) that is formed by extending the same sectional shape, configured to guide the movement of the movable member, and made as a cylindrical rod of a soft magnetic material in this embodiment. Reference numerals 321c and 321d provided in the movable barrel 321 are guide bar holding holes for positioning the main guide bar 324 relative to the focus lens L301 while suppressing the tilt and eccentricity with high accuracy. The main guide bar 324 is inserted into the holding holes 321c and 321d, and is adhered to the movable barrel 321 at a recess portion 321a. In this embodiment, the movable barrel 321 and the main guide bar 324 integrally move in the optical axis direction.

Reference numeral 325 is a sub guide bar (sub guide member) formed by extending the same sectional shape and fixed to the fixed member in parallel with the main guide bar 324. The front fixed frame 322 and the rear fixed frame 323 have unillustrated shapes similar to the first embodiment, and are accurately integrated with each other by fastening screws or the like. A virtual lines connecting the reference holes 322c and 323c through which the main guide bar 324 penetrates is accurately positioned, and both ends of the sub guide bar 325 are accurately positioned so that the sub guide bar 325 is held parallel to the optical axis.

Figure 13B:
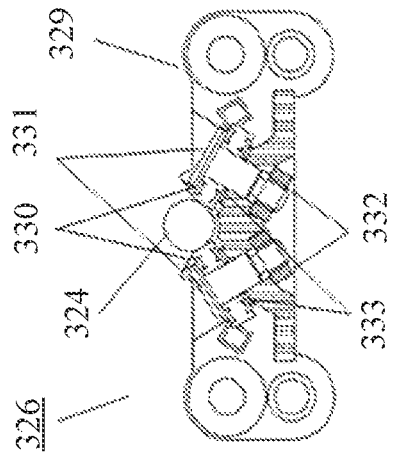
FIGS. 13A to 13D are structural diagrams of a linear motion guiding unit according to the third embodiment.
Figure 13D:
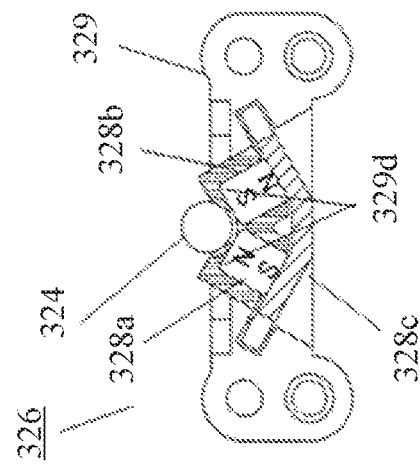
Figure 13A:
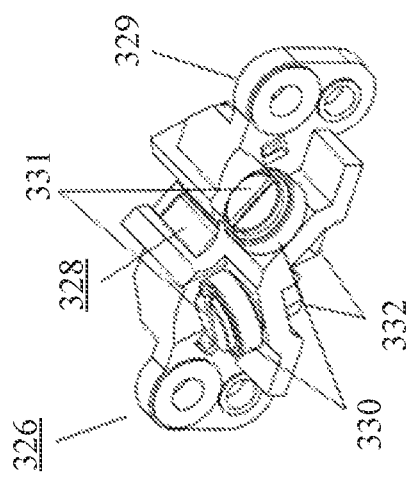
Figure 13C:
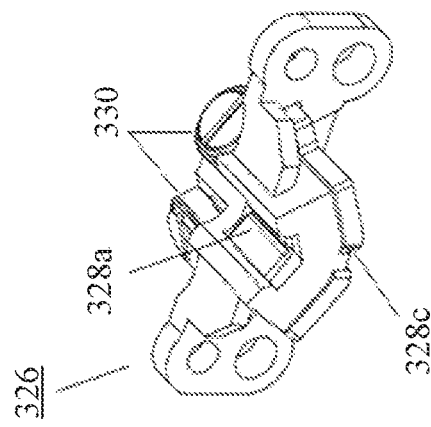

Referring now to FIGS. 13A to 13D, a description will be given of the structure of the linear motion guiding unit 326. FIGS. 13A to 13D are structural diagrams of the linear motion guiding unit 326. FIG. 13A is a perspective view, FIG. 13B is a sectional view of principal part, FIG. 13C is a perspective view viewed from a direction different from that in FIG. 13A, and FIG. 13D is a sectional view of the principal part.

Reference numeral 329 denotes a support base and 330 is a ball bearing (a pair of rotating elements). Similar to the first embodiment, the ball bearing 330 includes an inner ring, an outer ring, a ball, and a holder, and its driving resistance is extremely small. The detailed internal structure of the ball bearing 330 will be omitted. Reference numeral 331 denotes a shaft screw configured to fix the inner ring of the ball bearing 330 at a predetermined position in the support base 329 via a metal washer 333 when the shaft screw 331 is screwed and tightened with the hexagon nut 332.

FIG. 13B is a sectional view of the linear motion guiding unit 326 on a plane including the rotation axes of the pair of ball bearings 330. Since the relationship between the main guide bar 324 and the ball bearing 330 is the same as the relationship between the main guide bar 124 and the ball bearing 130 in FIG. 4C in the first embodiment, a detailed description thereof will be omitted. Reference numeral 328 denotes a magnet unit, which is held by the linear motion guiding unit 326.

FIG. 13D is a sectional view at the position of the magnet unit 328. Reference numerals 328a and 328b denote permanent magnets with opposite magnetizing directions. Reference numeral 328c denotes a back yoke, which constitutes a supporting permanent magnet. The permanent magnets 328a and 328b are fixed while they contact the contact surface 329d of the support base 329. Since the main guide bar 324 is made of a soft magnetic material and magnetically attracts the magnet unit 328, the pair of ball bearings 330 and the main guide bar 324 contact each other to form a biasing member. In this embodiment, the support base 329 is provided with a magnet unit 328 that is magnetically coupled with the ball bearings 330 that contact the main guide bar 324. Since the distance between the magnet unit 328 and the main guide bar 324 is set by the contact surface 329d, a more stable magnetic attraction force can be set.

Figure 14A:
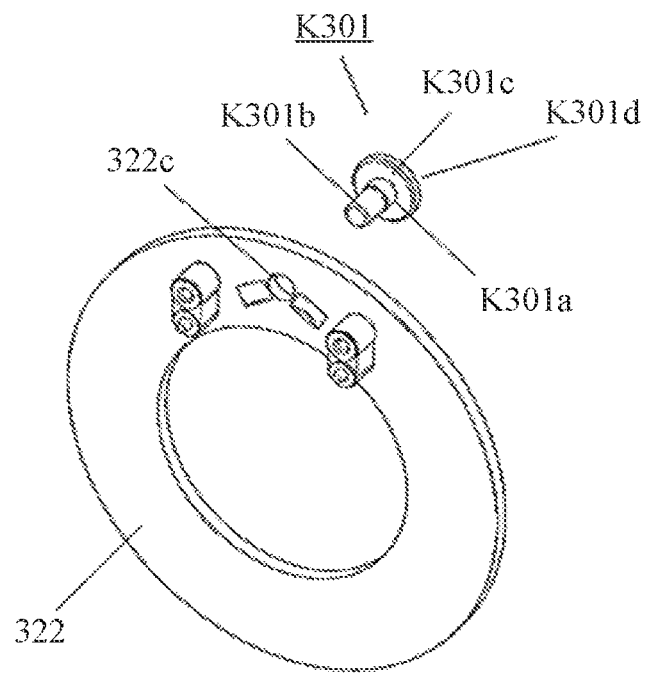
FIGS. 14A to 14D are explanatory diagrams of an assembled structure of the linear motion guiding unit according to the third embodiment.

Referring now to FIGS. 14A to 14D, a description will be given of the assembled structure of the linear motion guiding unit 326 for suppressing the tilt and eccentricity of the focus lens L301 held by the movable barrel 321 and accurately holding and guiding the focus lens L301. FIG. 14A is a perspective view of the fixed frame and the assembly reference shaft. Reference numeral K301 denotes the assembly reference axis. The assembly reference shaft K301 includes a first shaft portion K301a, a second shaft portion K301b, and a flange portion K301c, and each portion is machined with high coaxial degree by a lathe or the like. The front fixed frame 322 has a reference hole 322c that serves as a reference for the fixed position of the linear motion guiding unit 326. The first shaft portion K301a of the assembly reference shaft K301 has the same diameter as that of the reference hole 322c in the front fixed frame 322, and the second shaft portion K301b has the same diameter as that of the main guide bar 324.

Figure 14B:
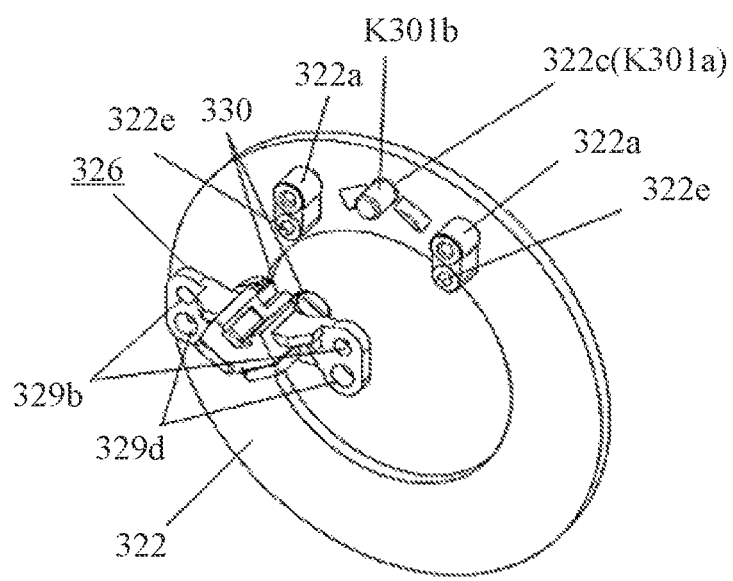

FIG. 14B is a perspective view of the front fixed frame 322 into which the assembly reference shaft K301 is inserted before the first linear motion guiding unit 326 is assembled. The first shaft portion K301a is formed coaxially with the reference hole 322c in the front fixed frame 322. Thus, when the first shaft portion K301a of the assembly reference shaft K301 is engaged with the reference hole 322c, the second shaft portion K301b is positioned at the same position as that of the main guide bar 324. When the two ball bearings 330 of the linear motion guiding unit 326 contact the second shaft portion K301b and they are incorporated into the front fixed frame 322, the state can be made as equivalently as the state of the linear motion guiding unit 326 relative to the main guide bar 324 in FIG. 12A.

The support base 329 has through-holes 329b for fixing to the front fixed frame 322 with fastening screws 327. There is a diameter difference between the outer diameter of the fastening screw 327 and the inner diameter of the through-hole 329b, and a necessary and sufficient gap is provided. Reference numeral 322a denotes a guide unit attachment portion having an attachment surface of the linear motion guiding unit 326 and a hole portion screwed with the fastening screw 327. Reference numerals 322e and 329d denote adhesion related shapes for reinforcing the fixture of the linear motion guiding unit described with reference to FIGS. 6E and 6F in the first embodiment. Reference numeral 322e denotes a conical protrusion provided on the front fixed frame 322, and reference numeral 329d denotes a conical slope provided on the support base 329.

Figure 14C:
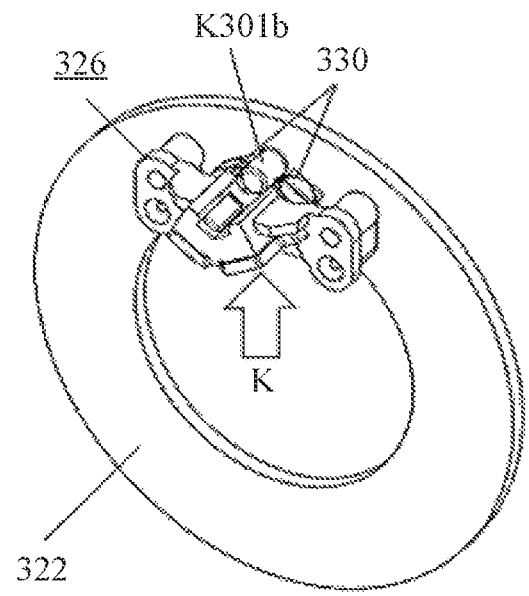
Figure 14D:
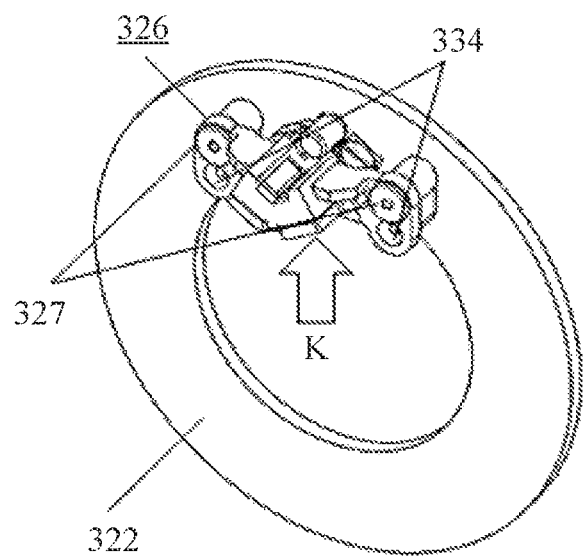

FIG. 14C is a perspective view of a determined state of the assembled position of the linear motion guiding unit 326 into the front fixed frame 322. The front fixed frame 322 and the assembly reference shaft K301 are properly fixed by an unillustrated jig, and the linear motion guiding unit 326 is pressed against the front fixed frame 322 by an unillustrated jig. In this state, the two ball bearings 330 are brought into contact with the second shaft portion K301b in an arrow K direction from the bottom. While this state is maintained, the fastening screws 327 are screwed into the front fixed frame 322 as illustrated in FIG. 14D, and the linear motion guiding unit 126 is fixed at a proper position relative to the main guide bar 324. Filling the space created by the conical protrusion 322e and the conical surface 329d with a gap filling adhesive 334 and curing it can serve to positively prevent a positional shift between the linear motion guiding unit 326 and the front fixed frame 322. Fixing the second linear motion guiding unit 326 to the rear fixed frame 323 with high accuracy in the same procedure can improve the suppressing accuracy of the tilt and eccentricity of the movable barrel 321. The structure that restricts the angular position around the main guide bar 324 of the movable barrel 321 using the sub guide bar 325 may be either that of the first embodiment, that of the second embodiment, or another structure.

This embodiment fixes the linear motion guiding unit 326 to the front fixed frame 322 and the rear fixed frame 323, and thus can set long the support portion in the optical axis direction relative to the main guide bar 324. Therefore, this structure is advantageous to the improved suppressing accuracy of the tilt of the focus lens L301.

Fourth Embodiment

Next follows a description of a linear motion guiding mechanism (focus linear motion guiding mechanism) according to a fourth embodiment of the present invention. FIGS. 15A to 15C are structural diagrams of the linear motion guiding mechanism according to this embodiment. Similar to the first embodiment, the structure of the focus driver will be omitted. FIG. 15A is a general perspective view of the linear motion guiding mechanism, FIG. 15B is a general perspective view in which the rear fixed frame is not illustrated for explanation convenience, and FIG. 15C is an exploded perspective view.

A focus lens L401 is an optical element that constitutes all or part of the optical system. Reference numeral 421 denotes a movable barrel (movable member) that holds the focus lens L401. Reference numeral 422 denotes a front fixed frame (fixed member) that serves as a base for the movement of the movable barrel 421 in the optical axis direction, and reference numeral 423 denotes a rear fixed frame (fixed member). The movable barrel 421 moves in the optical axis direction relative to the front fixed frame 422 and the rear fixed frame 423. Reference numeral 426 denote a first linear motion guiding unit (first support member) and a second linear motion guiding unit (second support member) spaced from each other in the optical axis direction, and integrated with the front fixed frame 422 and the rear fixed frame 423 via fastening screws 427. Reference numeral 422c is a reference hole having a reference shape for determining the fixed position of the support member onto the front fixed frame 422. Reference numeral 423c is a reference hole having a reference shape for determining the fixed position of the support member onto the rear fixed frame 423.

Reference numeral 424 is a main guide bar (main guide member) that guides the movement of the movable barrel 421 and is formed as a cylindrical rod in this embodiment that extends the same sectional shape. Reference numerals 421c and 421d provided on the movable barrel 421 denote guide bar holding holes for positioning the main guide bar 424 relative to the focus lens L401 with high suppressing accuracy of the tilt and eccentricity. The main guide bar 424 is inserted into the holding holes 421c and 421d, and is adhered to the movable barrel 421 at a recessed portion 421a. In this embodiment, the movable barrel 421 and the main guide bar 424 integrally move in the optical axis direction.

Reference numeral 425 denotes a sub guide bar (sub guide member) formed by extending the same sectional shape and fixed to the fixed member in parallel with the main guide bar 424. The front fixed frame 422 and the rear fixed frame 423 have unillustrated shape similar to the first embodiment, and both are accurately integrated by fastening screws or the like. A virtual line connecting the centers of the reference holes 422c and 423c through which the main guide bar 424 penetrates is accurately positioned, and both ends of the sub guide bar 425 are accurately positioned so that the sub guide bar 425 is held parallel to the optical axis.

In the first to third embodiments, the biasing member that brings the pair of rotating elements held by the first support member and the second support member and two sets of the pair of rotating elements and the main guide member into contact with each other uses a magnetic attraction between the magnetic material and the magnet. On the other hand, the biasing member in this embodiment has a mechanical structure using a spring.

Figure 16A:
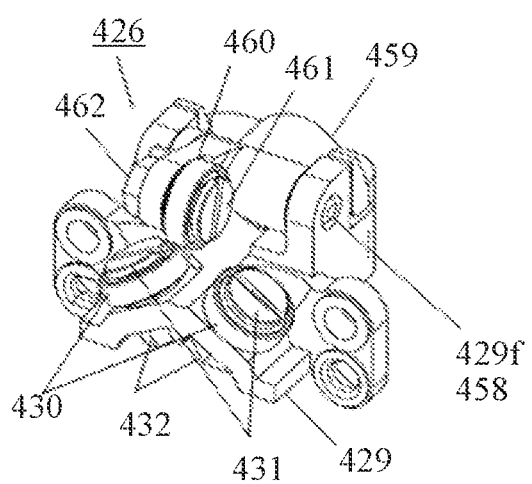
FIGS. 16A to 16E are structural diagrams of a linear motion guiding unit according to the fourth embodiment.
Figure 16B:
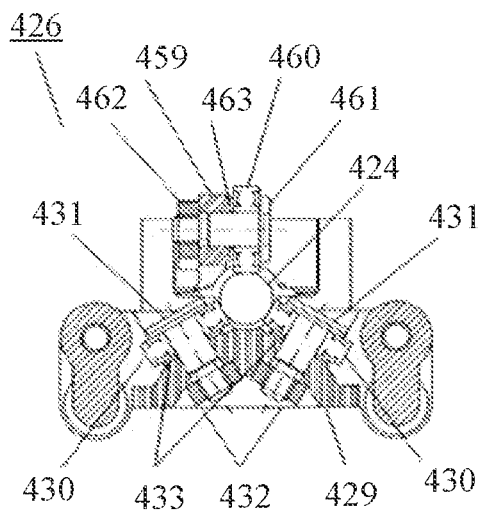
Figure 16C:
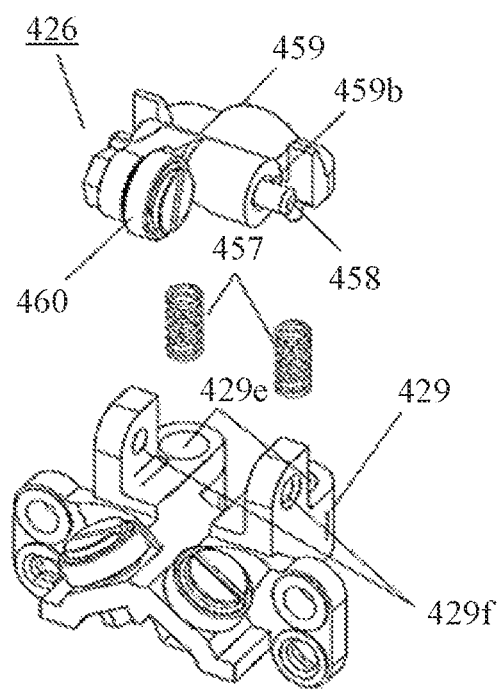
Figure 16D:
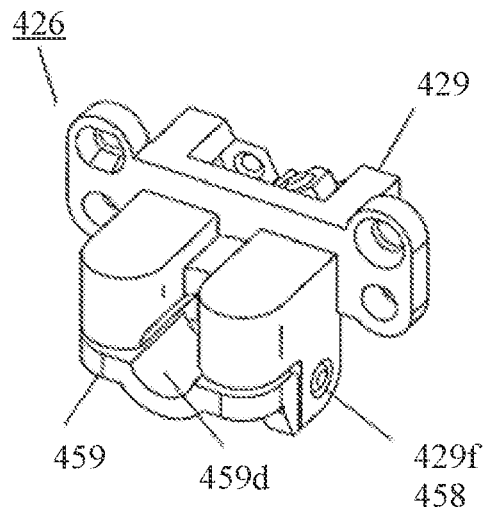
Figure 16E:
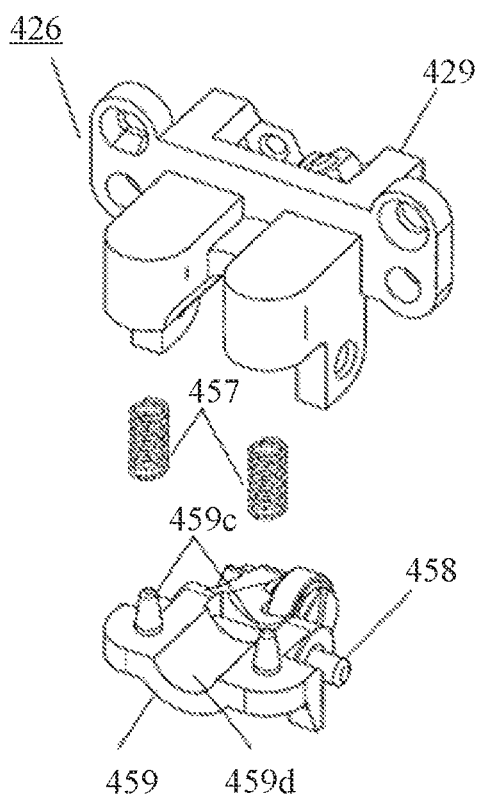

Referring now to FIGS. 16A to 16E, a description will be given of the structure of the linear motion guiding unit 426. FIGS. 16A to 16E are structural diagrams of the linear motion guiding unit 426. FIG. 16A is a perspective view of the linear motion guiding unit 426, FIG. 16B is a sectional view of principal part, FIG. 16C is an exploded perspective view of FIG. 16A, FIG. 16D is a perspective view viewed from a direction different from that of FIG. 16A, and FIG. 16E is an exploded perspective view.

Reference numeral 429 denotes a support base, and reference numeral 430 denotes a ball bearing (a pair of rotating elements). Similar to the first embodiment, the ball bearing 430 includes an inner ring, an outer ring, a ball, and a holder, and its driving resistance is extremely small. The detailed internal structure of the ball bearing 430 will be omitted in the sectional view. Reference numeral 431 denotes a shaft screw configured to fix the inner ring of the ball bearing 430 at a predetermined position of the support base 429 via a metal washer 433, when the shaft screw 431 is screwed and tightened with a hexagon nut 432. Reference numeral 459 denotes a biasing member, and reference numeral 460 denotes a ball bearing that constitutes part of the biasing member. The ball bearing 460 has the same structure as that of the ball bearing 430, and is assembled to the biasing member 459 by a shaft screw 461, a hexagon nut 462, and a metal washer 463.

FIG. 16B is a sectional view of the linear motion guiding unit 426 in a plane including the rotation axes of the pair of ball bearings 430. Since the relationship between the main guide bar 424 and the ball bearing 430 is the same as the relationship between the main guide bar 124 and the ball bearing 130 in FIG. 4C in the first embodiment, a detailed description thereof will be omitted. The ball bearing 460 applies a pressure so that the main guide bar 424 contact the pair of ball bearings 430. This characteristic will be further described with reference to FIGS. 16A, 16C, 16D, and 16E. Reference numeral 458 denotes a rotation shaft, which is held in the support hole 429f in the support base 429 and supports the biasing member 459 swingably relative to the rotation hole portion 459b. Reference numeral 457 denotes an energizing compression coil spring. The compression coil spring 457 is housed in a hole portion 429e in the support base 429, and engaged with a protrusion 459c of the biasing member 459 to push it up. Thus, the main guide bar 424 is sandwiched and held by pushing down the ball bearing 460 toward the pair of ball bearings 430 using the rotational axis 458 as a rotational axis.

In this embodiment, similarly to the third embodiment, the first linear motion guiding unit and the second linear motion guiding unit 426 are fixed onto the front fixed frame 422 and the rear fixed frame 423 based on the reference holes 422c and 423c. A duplicate description of this structure will be omitted. The configuration relating to the sub guide bar 425 is the same as that in the third embodiment.

This embodiment constitutes a mechanical biasing member using a spring. This embodiment relates to a linear motion guiding mechanism, and the driver and the position detector are not limited. The driver can cover one, such as a VCM, which directly uses a magnetic force to generate a driving force and generates a leakage flux in the periphery, and the position detector can cover one that detects magnetic flux changes of a magnet with an MR device or the like. This embodiment does not use the permanent magnet as the biasing member, thus reduces restrictions on the type selection and arrangement of the driver and the position detector, and improves the degree of freedom of the overall structure.

As described above, the lens apparatus according to each embodiment has a linear motion guiding mechanism that can suppress the tilt and eccentricity of the optical element configured to move in the optical axis direction, accurately hold and guide the optical element, and enable the optical element to move with a small driving resistance. Each embodiment can provide, for example, a lens apparatus and an image pickup apparatus, which are advantageous in that an optical element configured to move in the optical axis direction is held and guided with high accuracy and is moved with a small driving resistance.

For example, each embodiment has discussed an interchangeable lens as a lens apparatus, the present invention is applicable to an image pickup apparatus in which a lens apparatus is integrated with a camera body, a digital still camera, a video camera, and the like.

Each of the above embodiments can provide, for example, a lens apparatus that is advantageous to a linear motion guidance of a movable member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-032718, filed on Feb. 28, 2020 which is hereby incorporated by reference herein in its entirety.

What is claimed is:

1. A lens apparatus comprising:
an optical element;
a fixed member;
a movable member configured to hold the optical element and movable in an optical axis direction relative to the fixed member;
a guide member configured to guide a movement of the movable member in an optical axis direction;
a first support member and a second support member spaced from each other in the optical axis direction;
a pair of rotating elements held by the first support member and the second support member, respectively;
a biasing member configured to bias the pair of rotating elements and the guide member into contact with each other;
a sub guide member fixed to the fixed member and disposed along the guide member;
a second rotating element fixed to the movable member and configured to restrict the movable member from rotating around the guide member; and
a second biasing member used to restrict the movable member from rotating, and to bias the second rotating element and the sub guide member into contact with each other,
wherein the first support member and the second support member are fixed to one of the movable member and the fixed member,
wherein the guide member is fixed to the other of the movable member and the fixed member, and
wherein a plane orthogonal to a rotational axis of the second rotating element extends along the optical axis direction.

2. The lens apparatus according to claim 1, wherein the guide member includes a cylindrical member having a specific shape in a section orthogonal to the optical axis direction.

3. The lens apparatus according to claim 2, wherein the specific shape is a circular shape.

4. The lens apparatus according to claim 1, wherein a first plane and a second plane orthogonal to a pair of rotational axes of the pair of rotating elements extend along the optical axis direction and intersect each other.

5. The lens apparatus according to claim 1, wherein each of the first support member and the second support member has a degree of freedom of a fixed position in a plane orthogonal to the optical axis direction, and
wherein an arrangement of the optical element is determined by the fixed position of each of the first support member and the second support member.

6. The lens apparatus according to claim 5, wherein the arrangement of the optical element includes a state of tilt eccentricity and a state of parallel eccentricity of the optical element.

7. The lens apparatus according to claim 5, wherein the movable member or the fixed member to which the first support member and the second support member are fixed has a reference shape for determining the fixed position of each of the first support member and the second support member.

8. The lens apparatus according to claim 7, wherein the movable member or the fixed member to which the first support member and the second support member are fixed has a reference hole having the reference shape.

9. The lens apparatus according to claim 1, wherein the sub guide member includes a magnetic material, and wherein the second biasing member includes a permanent magnet and is fixed to the movable member.

10. An image pickup apparatus comprising:
a lens apparatus; and
an image sensor configured to capture an image formed by the lens apparatus,
wherein the lens apparatus includes:
an optical element;
a fixed member;
a movable member configured to hold the optical element and movable in an optical axis direction relative to the fixed member;
a guide member configured to guide a movement of the movable member in an optical axis direction;
a first support member and a second support member spaced from each other in the optical axis direction;
a pair of rotating elements held by the first support member and the second support member, respectively;
a biasing member configured to bias the pair of rotating elements and the guide member into contact with each other;
a sub guide member fixed to the fixed member and disposed along the guide member;
a second rotating element fixed to the movable member and configured to restrict the movable member from rotating around the guide member; and
a second biasing member used to restrict the movable member from rotating, and to bias the second rotating element and the sub guide member into contact with each other,
wherein the first support member and the second support member are fixed to one of the movable member and the fixed member,
wherein the guide member is fixed to the other of the movable member and the fixed member, and
wherein a plane orthogonal to a rotational axis of the second rotating element extends along the optical axis direction.

11. A lens apparatus comprising:
an optical element;
a fixed member;
a movable member configured to hold the optical element and movable in an optical axis direction relative to the fixed member;
a guide member configured to guide a movement of the movable member in an optical axis direction;
a first support member and a second support member spaced from each other in the optical axis direction;
a pair of rotating elements held by the first support member and the second support member, respectively; and
a biasing member configured to bias the pair of rotating elements and the guide member into contact with each other,
wherein the first support member and the second support member are fixed to one of the movable member and the fixed member,
wherein the guide member is fixed to the other of the movable member and the fixed member,
wherein each of the first support member and the second support member has a degree of freedom of a fixed position in a plane orthogonal to the optical axis direction, and
wherein an arrangement of the optical element is determined by the fixed position of each of the first support member and the second support member.

* * * * *